US012576601B2

(12) United States Patent
Boyer et al.

(10) Patent No.: US 12,576,601 B2
(45) Date of Patent: Mar. 17, 2026

(54) COMPOSITE STRUCTURE FOR A TURBINE ENGINE

(71) Applicant: General Electric Company, Schenectady, NY (US)

(72) Inventors: Mitchell Boyer, Cincinnati, OH (US); Ming Xie, Dayton, OH (US); Leslie L. Langenbrunner, Cincinnati, OH (US); Douglas Lorrimer Armstrong, Needham, MA (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 138 days.

(21) Appl. No.: 18/426,981

(22) Filed: Jan. 30, 2024

(65) Prior Publication Data

US 2025/0242557 A1      Jul. 31, 2025

(51) Int. Cl.
B29C 70/48      (2006.01)
B29C 70/24      (2006.01)
F01D 5/28      (2006.01)

(52) U.S. Cl.
CPC ............. B29C 70/48 (2013.01); F01D 5/282 (2013.01)

(58) Field of Classification Search
CPC ..... D10B 2403/033; F01D 5/34; F01D 5/282; B29C 70/541; B29C 70/446; B29C 70/304; B29C 70/205; B29C 70/48; D03D 25/005; D03D 3/02
See application file for complete search history.

(56) References Cited

U.S. PATENT DOCUMENTS

| | | | | | |
|---|---|---|---|---|---|
| 2,857,094 | A | * | 10/1958 | Erwin | F01D 5/282 |
| | | | | | 264/261 |
| 3,403,844 | A | * | 10/1968 | Stoffer | F04D 29/023 |
| | | | | | 156/173 |
| 3,616,508 | A | * | 11/1971 | Wallett | F01D 5/282 |
| | | | | | 416/214 R |
| 4,098,559 | A | * | 7/1978 | Price | F01D 5/34 |
| | | | | | 416/241 A |
| 4,363,602 | A | * | 12/1982 | Martin | F01D 5/34 |
| | | | | | 416/241 A |

(Continued)

FOREIGN PATENT DOCUMENTS

| | | |
|---|---|---|
| EP | 3795330 B1 | 6/2023 |
| WO | 2006062670 A1 | 6/2006 |
| WO | 2010001003 A1 | 1/2010 |

*Primary Examiner* — Matthew J Daniels
(74) *Attorney, Agent, or Firm* — Venable LLP; Edward A. Kmett; Michele V. Frank

(57)      ABSTRACT

A method of manufacturing a composite component having an outer shell, an inner hub, and a plurality of struts connecting the outer shell and the inner hub. An initial outer shell hoop preform is woven and includes a plurality of bifurcated strut portions on an exterior side of the initial outer shell hoop preform. The initial outer shell hoop preform is turned inside-out to form a woven outer shell hoop preform so that the bifurcated strut portions are arranged on the interior side to extend inward. The woven outer shell hoop preform is installed on a mold tooling structure, along with an inner hub preform, and the bifurcated strut portions are connected to inner hub pi-joint members of the inner hub preform. A matrix material is injected into the mold tooling structure and a curing process is applied to the mold tooling structure to obtain the composite component.

20 Claims, 17 Drawing Sheets

(56) References Cited

U.S. PATENT DOCUMENTS

| | | | | |
|---|---|---|---|---|
| 4,379,798 A | * | 4/1983 | Palmer | B29C 70/24 |
| | | | | 442/205 |
| 4,460,531 A | * | 7/1984 | Harris | B29C 70/48 |
| | | | | 156/173 |
| 4,576,770 A | * | 3/1986 | Schultz | B29C 70/24 |
| | | | | 264/129 |
| 4,671,470 A | * | 6/1987 | Jonas | B29C 66/1142 |
| | | | | 428/116 |
| 4,676,722 A | * | 6/1987 | Marchal | F04D 29/023 |
| | | | | 416/241 A |
| 4,747,900 A | * | 5/1988 | Angus | B29C 45/0005 |
| | | | | 264/108 |
| 4,786,347 A | * | 11/1988 | Angus | F04D 29/321 |
| | | | | 264/108 |
| 4,826,645 A | * | 5/1989 | Angus | F04D 29/023 |
| | | | | 264/108 |
| 5,429,853 A | | 7/1995 | Darrieux | |
| 5,451,448 A | * | 9/1995 | Sawko | B64G 1/58 |
| | | | | 428/184 |
| 5,605,440 A | * | 2/1997 | Bocoviz | B29C 70/48 |
| | | | | 244/17.19 |
| 5,921,754 A | * | 7/1999 | Freitas | B29C 70/345 |
| | | | | 264/258 |
| 5,951,255 A | * | 9/1999 | Krenkel | F04D 29/181 |
| | | | | 416/241 A |
| 6,676,882 B2 | * | 1/2004 | Benson | B29C 70/465 |
| | | | | 156/289 |
| 6,712,099 B2 | * | 3/2004 | Schmidt | D03D 25/005 |
| | | | | 442/205 |
| 6,874,543 B2 | * | 4/2005 | Schmidt | B29B 11/16 |
| | | | | 442/205 |
| 7,938,627 B2 | * | 5/2011 | Muller | F04D 29/023 |
| | | | | 416/198 A |
| 8,079,387 B2 | | 12/2011 | Goering et al. | |
| 8,118,546 B2 | | 2/2012 | Morrison | |
| 8,157,212 B2 | | 4/2012 | Biornstad et al. | |
| 8,696,319 B2 | | 4/2014 | Naik | |
| 8,870,120 B2 | | 10/2014 | Sanderson et al. | |
| 8,943,697 B2 | | 2/2015 | Kamaraj et al. | |
| 9,022,733 B2 | | 5/2015 | Coupe et al. | |
| 9,616,629 B2 | | 4/2017 | Fabre et al. | |
| 9,808,988 B2 | | 11/2017 | Kwon et al. | |
| 10,232,926 B2 | | 3/2019 | Goehlich | |
| 10,703,053 B2 | | 7/2020 | Gordon | |
| 11,491,743 B2 | | 11/2022 | Le Hong et al. | |
| 12,366,175 B1 | * | 7/2025 | Xie | F01D 9/041 |
| 2003/0235502 A1 | * | 12/2003 | Van Dine | F04D 29/326 |
| | | | | 416/230 |
| 2006/0121809 A1 | * | 6/2006 | Goering | D03D 25/005 |
| | | | | 442/205 |
| 2009/0317246 A1 | * | 12/2009 | Lutz | F01D 9/042 |
| | | | | 415/200 |
| 2010/0105269 A1 | * | 4/2010 | Goering | B29B 11/16 |
| | | | | 442/205 |
| 2011/0206522 A1 | * | 8/2011 | Alvanos | F01D 5/3007 |
| | | | | 428/68 |
| 2012/0099982 A1 | * | 4/2012 | Coupe | C04B 35/5603 |
| | | | | 264/103 |
| 2013/0149130 A1 | * | 6/2013 | Hasting | F01D 9/042 |
| | | | | 415/208.1 |
| 2013/0156594 A1 | * | 6/2013 | Kray | F01D 5/34 |
| | | | | 264/258 |
| 2013/0202425 A1 | | 8/2013 | Balk | |
| 2014/0072443 A1 | * | 3/2014 | Mateo | F01D 5/282 |
| | | | | 29/889.71 |
| 2014/0133989 A1 | | 5/2014 | Belmonte et al. | |
| 2014/0205463 A1 | * | 7/2014 | Herraiz | F01D 5/225 |
| | | | | 29/889.71 |
| 2015/0354377 A1 | | 12/2015 | Gimat et al. | |
| 2016/0082674 A1 | | 3/2016 | Kray et al. | |
| 2017/0021575 A1 | | 1/2017 | Hansen et al. | |
| 2018/0119550 A1 | | 5/2018 | Berdou et al. | |
| 2020/0003061 A1 | | 1/2020 | Lanfant et al. | |
| 2020/0123917 A1 | | 4/2020 | Husband et al. | |
| 2021/0010377 A1 | | 1/2021 | Blanquart et al. | |
| 2021/0285332 A1 | * | 9/2021 | Frey | F02C 7/28 |
| 2022/0372882 A1 | * | 11/2022 | Marchal | F01D 5/282 |

* cited by examiner

S10

Weave woven fabric

S20

Forming an initial preform
using the woven fabric

S30

Shape an initial preform to
form shaped preform

S40

Inject resin

S50

Cure

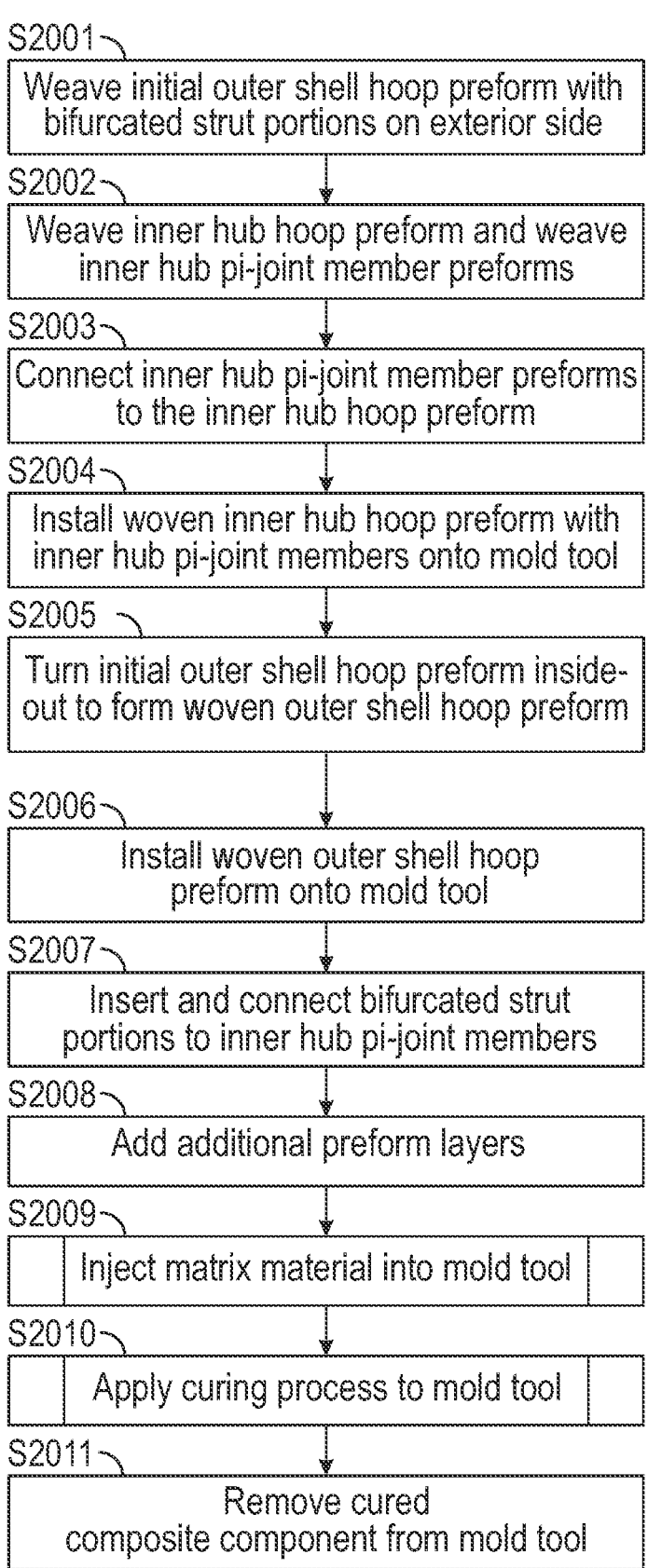

S2001
Weave initial outer shell hoop preform with bifurcated strut portions on exterior side S2002
Weave inner hub hoop preform and weave inner hub pi-joint member preforms S2003
Connect inner hub pi-joint member preforms to the inner hub hoop preform S2004
Install woven inner hub hoop preform with inner hub pi-joint members onto mold tool S2005
Turn initial outer shell hoop preform inside-out to form woven outer shell hoop preform S2006
Install woven outer shell hoop preform onto mold tool S2007
Insert and connect bifurcated strut portions to inner hub pi-joint members S2008
Add additional preform layers S2009
Inject matrix material into mold tool S2010
Apply curing process to mold tool S2011
Remove cured composite component from mold tool

FIG. 20

COMPOSITE STRUCTURE FOR A TURBINE ENGINE

GOVERNMENT INTEREST

This invention was made with United States Government support. The United States Government may have certain rights in the invention.

TECHNICAL FIELD

The present disclosure relates to composite components and methods of forming the composite components, particularly, aircraft composite components for aircraft engines.

BACKGROUND

Turbine engines used in aircraft generally include a fan and a turbo-engine section arranged in flow communication with one another. A combustor is arranged in the turbo-engine to generate combustion gases for driving a turbine in the turbo-engine of the turbine engine, and the turbine may be used to drive the fan. A portion of air flowing into the fan flows through the turbo-engine as core air, and another portion of the air flowing into the fan bypasses the core section and flows through the turbine engine as bypass air. The turbo-engine section may include one or more compressors to compress the core air before the core air flows into the combustor. Composite materials may be used to manufacture various components of the turbine engine, particularly, when the turbine engine is a turbine engine for an aircraft.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 20 is a flowchart of process steps for implementing a method of manufacturing a composite component, according to an aspect of the present disclosure.

DETAILED DESCRIPTION

Figure 1:
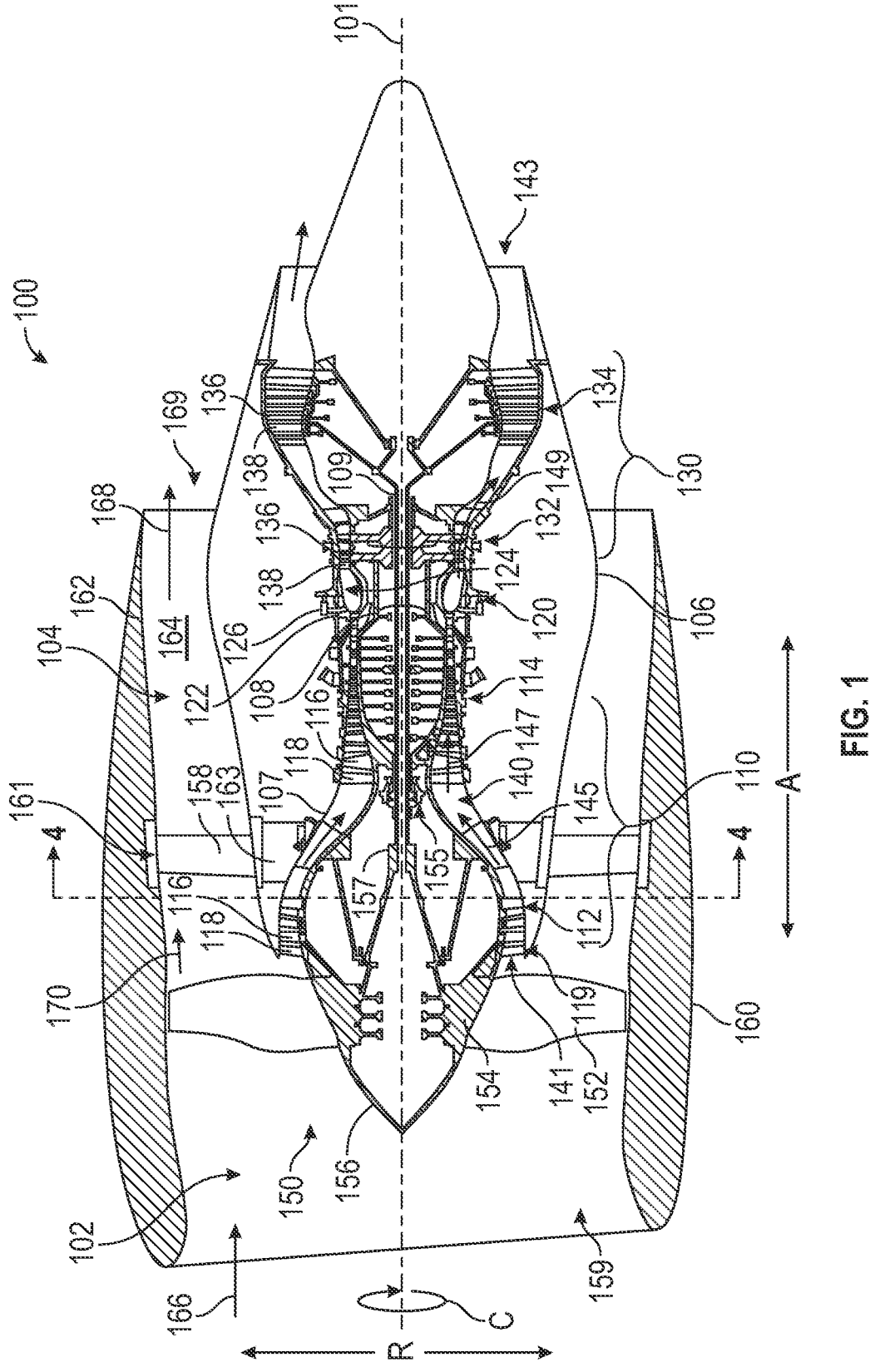
FIG. 1 is a schematic, cross-sectional view of a turbine engine of for an aircraft.

Features, advantages, and embodiments of the present disclosure are set forth or apparent from a consideration of the following detailed description, drawings, and claims. Moreover, the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the present disclosure.

As used herein, the terms "first," "second," "third," and the like, may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached," "connected," and the like, refer to both direct coupling, fixing, attaching, or connecting, as well as indirect coupling, fixing, attaching, or connecting through one or more intermediate components or features, unless otherwise specified herein.

As used herein, the terms "axial" and "axially" refer to directions and orientations that extend substantially parallel to a centerline of the turbine engine. Moreover, the terms "radial" and "radially" refer to directions and orientations that extend substantially perpendicular to the centerline of the turbine engine. In addition, as used herein, the terms "circumferential" and "circumferentially" refer to directions and orientations that extend arcuately about the centerline of the turbine engine.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially" is not to be limited to the precise value specified. In at least some instances, the approximating language may correspond to the precision of an instrument for measuring the value, or the precision of the methods or the machines for constructing or manufacturing the components and/or systems. For example, the approximating language may refer to being within a one, two, four, ten, fifteen, or twenty percent margin in either individual values, range(s) of values, and/or endpoints defining range(s) of values.

The terms "vane" and "strut" may be used interchangeably herein, and generally refer to a structural component implemented to provide structural support between two circular (or cylindrical) elements of a gas turbine engine, and/or to redirect a flow of air passing through two circular (or cylindrical) elements.

Here and throughout the specification and claims, range limitations are combined and interchanged. Such ranges are identified and include all the sub-ranges contained therein unless context or language indicates otherwise. For example, all ranges disclosed herein are inclusive of the endpoints, and the endpoints are independently combinable with each other.

The term "composite," as used herein, is indicative of a material having two or more constituent materials. A composite can be a combination of at least two or more metallic, non-metallic, or a combination of metallic and non-metallic elements or materials. Examples of a composite material can be, but not limited to, a polymer matrix composite (PMC), a ceramic matrix composite (CMC), a metal matrix composite (MMC). The composite may be formed of a matrix material and a reinforcing element, such as a fiber (referred to herein as a reinforcing fiber).

As used herein "reinforcing fibers" may include, for example glass fibers, carbon fibers, steel fibers, or paraaramid fibers, such as Kevlar® available from DuPont of Wilmington, Delaware. The reinforcing fibers may be in the form of fiber tows that include a plurality of fibers that are formed into a bundle.

"Preform" as used herein is a piece of three-dimensional woven fabric formed by a plurality of reinforcing fibers including warp fiber tows and weft fiber tows.

As used herein, a "composite component" refers to a structure or a component including any suitable composite material. Composite components, such as a composite airfoil, can include several layers or plies of composite material. The layers or plies can vary in stiffness, material, and dimension to achieve the desired composite component or composite portion of a component having a predetermined weight, size, stiffness, and strength.

One or more layers of adhesive can be used in forming or coupling composite components. The adhesive can require curing at elevated temperatures or other hardening techniques.

As used herein, PMC refers to a class of materials. The PMC material may be a prepreg. A prepreg is a reinforcement material (e.g., a reinforcing fiber) pre-impregnated with a polymer matrix material. Non-limiting examples of processes for producing polymeric prepregs include hot melt pre-pregging in which a molten resin is deposited onto the fiber reinforcement and powder pre-pregging in which a resin is deposited onto the fiber reinforcement material, by way of a non-limiting example, electrostatically, and then adhered to the fiber, by way of a non-limiting example, in an oven or with the assistance of heated rollers.

Resins for matrix materials of PMCs can be generally classified as thermosets or thermoplastics. Thermoplastic resins are generally categorized as polymers that can be repeatedly softened and caused to flow when heated, and hardened when sufficiently cooled due to physical rather than chemical changes. Notable example classes of thermoplastic resins include nylons, thermoplastic polyesters, polyaryletherketones, and polycarbonate resins. Specific examples of high-performance thermoplastic resins that have been contemplated for use in aerospace applications include, polyetheretherketone (PEEK), polyetherketoneketone (PEKK), polyetherimide (PEI), polyaryletherketone (PAEK), and polyphenylene sulfide (PPS). In contrast, once fully cured into a hard rigid solid, thermoset resins do not undergo significant softening when heated, but instead, thermally decompose when sufficiently heated. Notable examples of thermoset resins include epoxy, bismaleimide (BMI), and polyimide resins.

Instead of using a prepreg with thermoplastic polymers, another non-limiting example utilizes a woven fabric. Woven fabrics can include, but are not limited to, dry carbon fibers woven together with thermoplastic polymer fibers or filaments. Non-prepreg braided architectures can be made in a similar fashion. With this approach, it is possible to tailor the fiber volume of the part by dictating the relative concentrations of the thermoplastic fibers and the reinforcement fibers that have been woven or braided together. Additionally, different types of reinforcement fibers can be braided or woven together in various concentrations to tailor the properties of the part. For example, glass fibers, carbon fibers, and thermoplastic fibers could all be woven together in various concentrations to tailor the properties of the part. The carbon fibers provide the strength of the system, the glass fibers can be incorporated to enhance the impact properties, which is a design characteristic for parts located near the inlet of the engine, and the thermoplastic fibers provide the binding for the reinforcement fibers.

In yet another non-limiting example, resin transfer molding (RTM) can be used to form at least a portion of a composite component. Generally, RTM includes the application of dry fibers to a mold or a cavity. The dry fibers can include prepreg, braided material, woven material, or any combination thereof. Resin can be pumped into or otherwise provided to the mold or the cavity to impregnate the dry fibers. The combination of the impregnated fibers and the resin is then cured and removed from the mold. When removed from the mold, the composite component can require post-curing processing. RTM may be a vacuum assisted process. That is, air from the cavity or the mold can be removed and replaced by the resin prior to heating or curing. The placement of the dry fibers also can be manual or automated. The dry fibers can be contoured to shape the composite component or to direct the resin. Optionally, additional layers or reinforcing layers of a material differing from the dry fiber can also be included or added prior to heating or curing.

As used herein, CMC refers to a class of materials with reinforcing fibers in a ceramic matrix. Generally, the reinforcing fibers provide structural integrity to the ceramic matrix. Some examples of reinforcing fibers can include, but are not limited to, non-oxide silicon-based materials (e.g., silicon carbide, silicon nitride, or mixtures thereof), non-oxide carbon-based materials (e.g., carbon), oxide ceramics (e.g., silicon oxycarbides, silicon oxynitrides, aluminum oxide ($Al_2O_3$), silicon dioxide ($SiO_2$), aluminosilicates such as mullite, or mixtures thereof), or mixtures thereof.

Some examples of ceramic matrix materials can include, but are not limited to, non-oxide silicon-based materials (e.g., silicon carbide, silicon nitride, or mixtures thereof), oxide ceramics (e.g., silicon oxycarbides, silicon oxynitrides, aluminum oxide ($Al_2O_3$), silicon dioxide ($SiO2$), aluminosilicates, or mixtures thereof), or mixtures thereof. Optionally, ceramic particles (e.g., oxides of Si, Al, Zr, Y, and combinations thereof) and inorganic fillers (e.g., pyrophyllite, wollastonite, mica, talc, kyanite, and montmorillonite) can also be included within the ceramic matrix.

Generally, particular CMCs can be referred to by their combination of type of fiber/type of matrix. For example, C/SiC for carbon-fiber-reinforced silicon carbide, SiC/SiC for silicon carbide-fiber-reinforced silicon carbide, SiC/SiN for silicon carbide fiber-reinforced silicon nitride, SiC/SiC—SiN for silicon carbide fiber-reinforced silicon carbide/silicon nitride matrix mixture, etc. In other examples, the CMCs can be comprised of a matrix and reinforcing fibers comprising oxide-based materials such as aluminum oxide ($Al_2O_3$), silicon dioxide ($SiO_2$), aluminosilicates, and mixtures thereof. Aluminosilicates can include crystalline materials such as mullite ($3Al_2O_3·2SiO_2$), as well as glassy aluminosilicates.

In certain non-limiting examples, the reinforcing fibers may be bundled (e.g., form fiber tows) and/or coated prior to inclusion within the matrix. The bundles of fibers may be impregnated with a slurry composition prior to forming the preform or after formation of the preform. The preform may then undergo thermal processing, and subsequent chemical processing to arrive at a component formed of a CMC material having a desired chemical composition. For example, the preform may undergo a cure or a burn-out to yield a high char residue in the preform, and subsequent melt-infiltration with silicon, or a cure or a pyrolysis to yield a silicon carbide matrix in the preform, and subsequent chemical vapor infiltration with silicon carbide. Additional steps may be taken to improve densification of the preform, either before or after chemical vapor infiltration, by injecting the preform with a liquid resin or a polymer followed by a thermal processing step to fill the voids with silicon carbide. CMC material as used herein may be formed using any known or hereafter developed methods including but not limited to melt infiltration, chemical vapor infiltration, polymer impregnation pyrolysis (PIP), or any combination thereof.

The term "metallic" as used herein is indicative of a material that includes metal such as, but not limited to, titanium, iron, aluminum, stainless steel, and nickel alloys. A metallic material or an alloy can be a combination of at least two or more elements or materials, where at least one is a metal.

Traditional two-dimensional (2D) layup designs typically used for forming composite gas turbine engine components are challenging to manufacture and may have limited interlaminar strength. Specifically, composite components for gas turbine engines are generally constructed with hand laid plies or by combining multiple woven or prefabricated preforms into one molded part. Hand layup or assembly of preforms increases the labor and costs required to build the component. Assembly of preforms also comes with assembly and positioning challenges. Moreover, a composite component formed from 2D plies or multiple preforms will be more likely to have limited interlaminar loading capability.

The composite materials discussed herein may be particularly suitable for use in turbine engines for aircraft. FIG. 1 is a schematic, cross-sectional view a turbine engine 100 that may be used on an aircraft. The turbine engine 100 has an axial direction A (extending parallel to a longitudinal centerline axis 101, shown for reference in FIG. 2), a radial direction R, and a circumferential direction. C. The circumferential direction C extends in a direction rotating about the longitudinal centerline axis 101 (the axial direction A). In the embodiment depicted in FIG. 1, the turbine engine 100 is a high bypass turbofan engine, including a fan section 102 and a turbo-engine 104 disposed downstream from the fan section 102.

The turbo-engine 104 depicted in FIG. 1 includes a tubular outer casing 106 that defines a core inlet 141. In this embodiment, the core inlet 141 is annular about the longitudinal centerline axis 101. The outer casing 106 encases the turbo-engine 104, and the turbo-engine 104 includes, in a serial flow relationship, a compressor section 110 including a booster or a low-pressure (LP) compressor 112 and a high-pressure (HP) compressor 114, a combustion section 120, and a turbine section 130 including a high-pressure (HP) turbine 132 and a low-pressure (LP) turbine 134, and a core air exhaust nozzle 143. The compressor section 110, the combustion section 120, the turbine section 130, and the core air exhaust nozzle 143 together define, at least in part, a core air flow path 140 extending from the core inlet 141 to the core air exhaust nozzle 143, and through which core air 145 flows.

Each of the LP compressor 112 and the HP compressor 114 may include a plurality of compressor stages. In each stage, a plurality of compressor blades 116 rotates relative to a corresponding plurality of static compressor vanes 118 to compress or to pressurize the core air 145 passing through the stage. In one embodiment, the static compressor vanes 118 may be formed as a stator vane structure 119 (which may also be an inlet guide vane structure) that may be a composite component formed in the same manner described herein for an outlet guide vane structure 161 (described below). In a single compressor stage, a plurality of compressor blades 116 can be provided in a ring, extending radially outwardly relative to the longitudinal centerline axis 101 from a blade platform to a blade tip (e.g., extend in the radial direction R). The compressor blades 116 may be a part of a compressor rotor that includes a disk and the plurality of compressor blades 116 extend radially from the disk. Other configurations of the compressor rotor may be used, including, for example, blisks where the disk and the compressor blades 116 are integrally formed with each other to be a single piece. The corresponding static compressor vanes 118 are positioned upstream of and adjacent to the rotating compressor blades 116. The compressor vanes 118 for a stage of the compressor can be mounted to a core casing 107 in a circumferential arrangement. The core casing 107 may define, at least in part, the core air flow path 140. Each compressor stage may be used to sequentially compress the core air 145 flowing through the core air flow path 140, generating compressed air 147. Any suitable number of compressor blades 116, compressor vanes 118, and compressor stages may be used.

Each of the HP turbine 132 and the LP turbine 134 also may include a plurality of turbine stages. In each stage, a set of turbine blades 136 rotate relative to a corresponding set of static turbine vanes 138 to extract energy from combustion gases 149 passing through the stage. The turbine blades 136 may be a part of a turbine rotor. Any suitable configuration for a turbine rotor may be used, including, for example, a disk with the plurality of turbine blades 136 extending from the disk. The corresponding static turbine vanes 138 are positioned upstream of and adjacent to the rotating turbine blades 136. The turbine vanes 138 for a stage of the turbine can be mounted to the core casing 107 in a circumferential arrangement.

In the combustion section 120, fuel, received from a fuel system (not shown), is injected into a combustion chamber 124 of a combustor 122 by fuel nozzles 126. The fuel is mixed with the compressed air 147 from the compressor section 110 to form a fuel and air mixture, which is ignited and burned in the combustor 122, generating combustion products (i.e., combustion gases 149) within the combustor 122. The combustion gases are discharged from the combustion chamber 124 to the turbine section 130. The combustion gases 149 may be directed into the turbine blades 136 of the HP turbine 132 and, then, the turbine blades 136 of the LP turbine 134, and the combustion gases 149 drive (rotate) the turbine blades 136 of the HP turbine 132 and the LP turbine 134. Any suitable number of turbine blades 136, turbine vanes 138, and turbine stages may be used. After flowing through the turbine section 130, the combustion gases 149 are exhausted from the turbine engine 100 through the core air exhaust nozzle 143 to provide propulsive thrust.

The turbine engine 100 and, more specifically, the turbo-engine 104 further includes one or more drive shafts. More specifically, the turbo-engine 104 includes a high-pressure (HP) shaft 108 drivingly connecting the HP turbine 132 to the HP compressor 114, and a low-pressure (LP) shaft 109 drivingly connecting the LP turbine 134 to the LP compressor 112. The HP shaft 108 and the LP shaft 109 may also be referred to as spools. More specifically, the HP turbine rotors of the HP turbine 132 are connected to the HP shaft 108, and the HP compressor rotors of the HP compressor 114 are connected to the HP shaft 108. When the HP turbine blades 136 and, thus, the HP turbine rotors of the HP turbine 132 are rotated by the combustion gases 149 flowing through the core air flow path 140, the HP turbine rotors of the HP turbine 132 rotate the HP compressor rotors and, thus, the HP compressor blades 116 of the HP compressor 114 via the HP shaft 108. Similarly, the LP turbine rotors of the LP turbine 134 are connected to the LP shaft 109, and the LP compressor rotors of the LP compressor 112 are connected to the LP shaft 109. When the LP turbine rotors and, thus, LP the turbine blades 136 of the LP turbine 134 are rotated by the combustion gases 149 flowing through the core air flow path 140, the LP turbine rotors of the LP turbine 134 rotate the LP compressor rotors and, thus, the LP compressor blades 116 of the LP compressor 112 via the LP shaft 109. The HP shaft 108 and the LP shaft 109 are disposed coaxially about the longitudinal centerline axis 101. The HP shaft 108 has a greater diameter than that of the LP shaft 109, and the HP shaft 108 is located radially outward of the LP shaft 109. The HP shaft 108 and the LP shaft 109 are rotatable about the longitudinal centerline axis 101 and, as discussed above, coupled to rotatable elements such as the HP/LP compressor rotors and the HP/LP turbine rotors.

The fan section 102 shown in FIG. 1 includes a fan 150 having a plurality of fan blades 152 coupled to a disk 154. The fan blades 152 and the disk 154 are connected to a fan shaft 157, which is connected to a reduction gearbox 155 that is connected with and driven by the LP shaft 109. Thus, the fan blades 152 and the disk 154 are rotatable, together, about the longitudinal centerline axis 101 and are driven by rotation of the LP shaft 109. The disk 154 is covered by a rotatable fan hub 156 that is aerodynamically contoured to promote an airflow through the plurality of fan blades 152. Further, a nacelle 160 circumferentially surrounds the fan 150 and/or at least a portion of the turbo-engine 104. The nacelle 160 may also be referred to as an annular fan casing or an outer nacelle. The nacelle 160 is supported relative to the turbo-engine 104 by a plurality of circumferentially spaced guide vanes (or struts) 158 (two shown in FIG. 1) that are part of a guide vane structure 161 that is connected to an intermediate frame structure 163. The guide vane structure 161 will be described in more detail below, and the guide vane structure 161 may be one example of a composite component that may be implemented in the gas turbine engine 100. A downstream section 162 of the nacelle 160 extends over an outer portion of the turbo-engine 104 and, more specifically, a downstream portion of the outer casing 106 so as to define a bypass airflow passage 164 therebetween.

During operation of the turbine engine 100, a volume of air 166 enters the turbine engine 100 through an inlet 159 of the nacelle 160 and/or the fan section 102. As the volume of air 166 passes across the fan blades 152, a first portion of the air 166 is a propelled by the fan blades 152 to generate a swirled fan airflow 170 that is directed or routed toward the guide vanes 158, where the swirled fan airflow 170 may be redirected by the guide vanes 158 to an axial flow in the axial direction A and into the bypass airflow passage 164 as bypass air 168. A second portion of air 166 (shown schematically as core air 145) is directed or is routed into the core inlet 141 to an upstream section of the core air flow path 140. Simultaneously, with the flow of the core air 145 through the core air flow path 140 (as discussed above), the bypass air 168 is routed through the bypass airflow passage 164 before being exhausted from a bypass air discharge nozzle 169 of the turbine engine 100, also providing propulsive thrust.

The turbine engine 100 shown in FIG. 1 and discussed herein (i.e., the turbofan engine) is provided by way of example only. In other embodiments, any other suitable engine may be utilized with aspects of the present disclosure. For example, in other embodiments, the engine may be any other suitable gas turbine engine, such as a turboshaft engine, a turboprop engine, a turbojet engine, an unducted single fan engine, and the like. In such a manner, in other embodiments, the gas turbine engine may have other suitable configurations, such as other suitable numbers or arrangements of shafts, compressors, turbines, fans, etc. Further, although the turbine engine 100 is shown as a direct drive, fixed-pitch turbofan engine, in other embodiments, the turbine engine 100 may be a geared turbine engine (e.g., including a gearbox between the fan 150 and a shaft driving the fan, such as the LP shaft 109), may be a variable pitch turbine engine (i.e., including a fan 150 having a plurality of fan blades 152 rotatable about their respective pitch axes), etc. Further, still, in alternative embodiments, aspects of the present disclosure may be incorporated into, or otherwise utilized with, any other type of engine, such as reciprocating engines.

The turbine engine 100 discussed herein is suitable for use on an aircraft. Suitable aircraft include, for example, an airplane, a helicopter, and an unmanned aerial vehicle (UAV). In other embodiments, the turbine engine may be any other turbine engine, such as an industrial turbine engine incorporated into a power generation system, or a nautical turbine engine on a ship or other vessel.

Various components of the turbine engine 100 may be formed from composite materials. These components are referred to herein as composite components. The fan blades 152, a fan casing having the guide vanes 158, compressor blades 116, and compressor vanes 118 may be made from PMC materials, for example. Other composites, such as CMC materials, may be used for other components, including, for example, turbine blades 136, turbine vanes 138, and components of the combustion section 120 such as combustor liners used to form the combustion chamber 124. Moreover, although the embodiments are described relative to a turbine engine 100, the composite components and methods of manufacturing may be used to form composite components used in applications beyond turbine engines.

Figures 2A, 2B:
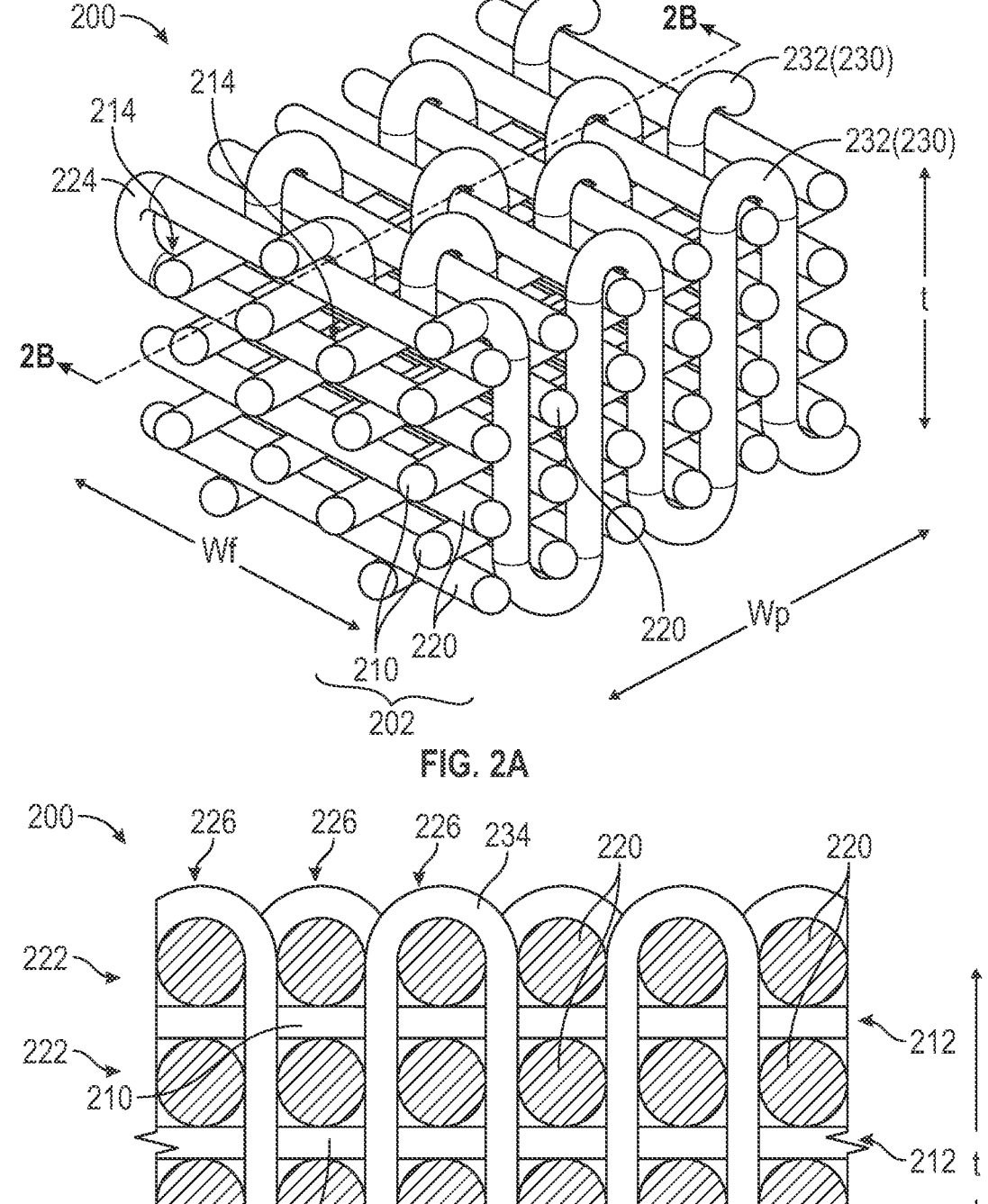
FIG. 2A is a schematic view of a three-dimensional fiber weave pattern, according to an aspect of the present disclosure.
FIG. 2B is a schematic, cross-sectional view of the fiber weave pattern shown in FIG. 2A taken along line 2B-2B in FIG. 2A, according to an aspect of the present disclosure.

FIG. 2A is a schematic view showing an exemplary three-dimensional fiber weave pattern that may be used to form a woven fabric 200. FIG. 2B is a schematic, cross-sectional view taken along plane 2B-2B in FIG. 2A. In embodiments discussed herein, the composite components may be formed from a plurality of reinforcing fibers and, more specifically, a plurality of reinforcing fiber tows 202. The plurality of reinforcing fiber tows 202 are woven together in a three-dimensional pattern to form the woven fabric 200. The plurality of reinforcing fiber tows 202 include a plurality of first fiber tows, which, in this embodiment, is a plurality of warp fiber tows 210. The plurality of reinforcing fiber tows 202 also include a plurality of second fiber tows, which, in this embodiment, is a plurality of weft fiber tows 220. The weft fiber tows 220 are oriented transversely to the warp fiber tows 210, and, in the depicted embodiment, the warp fiber tows 210 and the weft fiber tows 220 are oriented generally orthogonally to each other. The woven fabric 200 thus includes a warp direction Wp (also referred to as a first direction) and a weft direction Wf (also referred to as a second direction). The warp fiber tows 210 extend in the warp direction Wp and the weft fiber tows 220 extend in the weft direction Wf.

In the depicted embodiment, the woven fabric 200 is a three-dimensional woven fabric and the woven fabric 200 also includes a thickness direction t. The thickness direction may also be referred to as a z direction. The warp fiber tows 210 are arrayed in both the weft direction Wf and the thickness direction t. The warp fiber tows 210 may be parallel to each other in both the weft direction Wf and the thickness direction t, and the woven fabric 200 may include a plurality of warp fiber layers 212 in the thickness direction t and a plurality of warp fiber columns 214 in the weft direction Wf. Three warp fiber layers 212 are depicted in FIGS. 2A and 2B, but the woven fabric 200 may include any other numbers of warp fiber layers 212, including more than three warp fiber layers 212.

During a weaving process, the warp fiber tows 210 may be held in tension in the warp direction Wp, and one of the weft fiber tows 220 is passed or drawn therethrough. A shuttle (not shown) may be used to draw the one of the weft fiber tows 220 through the warp fiber tows 210. The shuttle may be passed through the warp fiber tows 210 in a first direction and then reversed to pass through the warp fiber tows 210 at a different height in a thickness direction t, thereby forming a plurality of weft fiber layers 222 in the thickness direction t. One of the weft fiber tows 220 may be continuous through at least a portion of the thickness of the woven fabric 200, and the one of the weft fiber tows 220 may include a portion extending in the thickness direction t, which may be referred to in some embodiments as a turnaround. This portion of the weft fiber tow thus may be referred to herein as a turnaround portion 224. The warp fiber tows 210 may be moved relative to each other to allow a space for the one of the weft fiber tows 220 to pass through the space. The warp fiber tows 210 may be moved relative to each other in different ways to create different patterns. In this way, weaving the woven fabric 200 includes positioning the warp fiber tows 210 (e.g., such that the warp fiber tows 210 are held stationary in tension), then laying the weft fiber tows 220 (e.g., such that the weft fiber tows 220 are drawn through and inserted over and under the corresponding warp fibers 210), and repeating this process until the woven fabric 200 is formed. The weft fiber tows 220 may be parallel to each other in both the warp direction Wp and the thickness direction t, and the woven fabric 200 may include the plurality of weft fiber layers 222 in the thickness direction t and a plurality of weft fiber columns 226 in the warp direction Wp.

The woven fabric 200 also includes a plurality of interlocking fiber tows 230 (also referred to as Z-weaver fiber tows). The interlocking fiber tows 230 are additional warp fiber tows that are directed through the thickness of the woven fabric 200 during weaving to stitch the reinforcing fiber tows 202 together. The interlocking fiber tows 230 are woven to extend between two or more of the weft fiber layers 222. Different fiber patterns may be used for the interlocking fiber tows 230. A first interlocking fiber pattern, shown in FIGS. 2A and 2B, is an orthogonal interlocking pattern and the interlocking fiber tows 230 are referred to herein as orthogonal interlocking fiber tows 232. In this pattern, the orthogonal interlocking fiber tows 232 extend substantially in a direction that is orthogonal to the warp direction Wp, which is the thickness direction t in the depicted embodiment. As with the weft fiber tows 220, the interlocking fiber tows 230 (e.g., the orthogonal interlocking fiber tows 232) may include a turnaround portion 234. In the depicted embodiment, the turnaround portion 234 of the orthogonal interlocking fiber tows 232 is positioned to form an alternating pattern between each warp fiber columns 214. In the depicted embodiment, the orthogonal interlocking fiber tows 232 extend through the thickness of the woven fabric 200 and may be referred to as through-thickness interlocking fiber tows, but other thicknesses may be used.

Figure 2C:
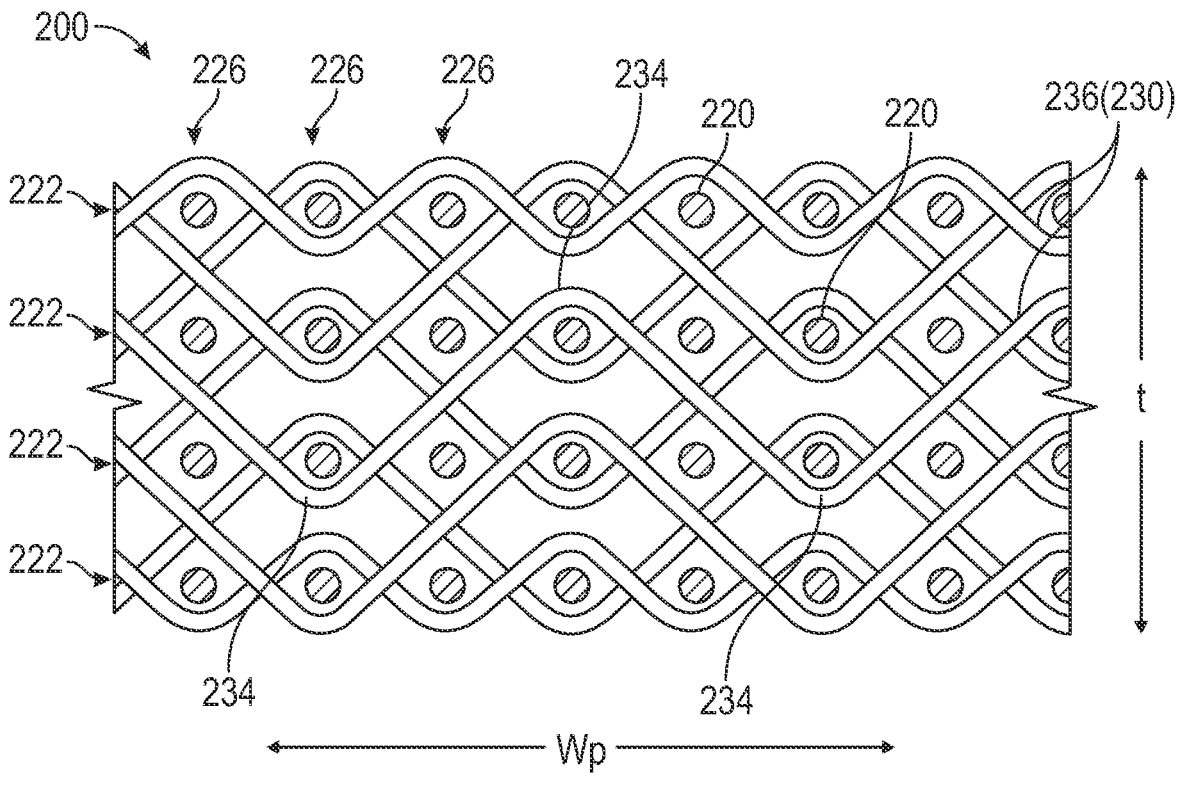
FIG. 2C is a schematic, cross-sectional view of a fiber weave pattern shown similar to fiber weave pattern shown in FIG. 2A, but with a different interlocking fiber pattern, according to an aspect of the present disclosure.

A second interlocking fiber pattern, shown in FIG. 2C, is an angle interlock pattern and, more specifically, a layer-to-layer angle interlock pattern. FIG. 2C is a cross-sectional view of a woven fabric taken from a perspective similar to FIG. 2B. The interlocking fiber tows 230 are referred to in this embodiment as angled interlocking fiber tows 236.

Figure 2D:
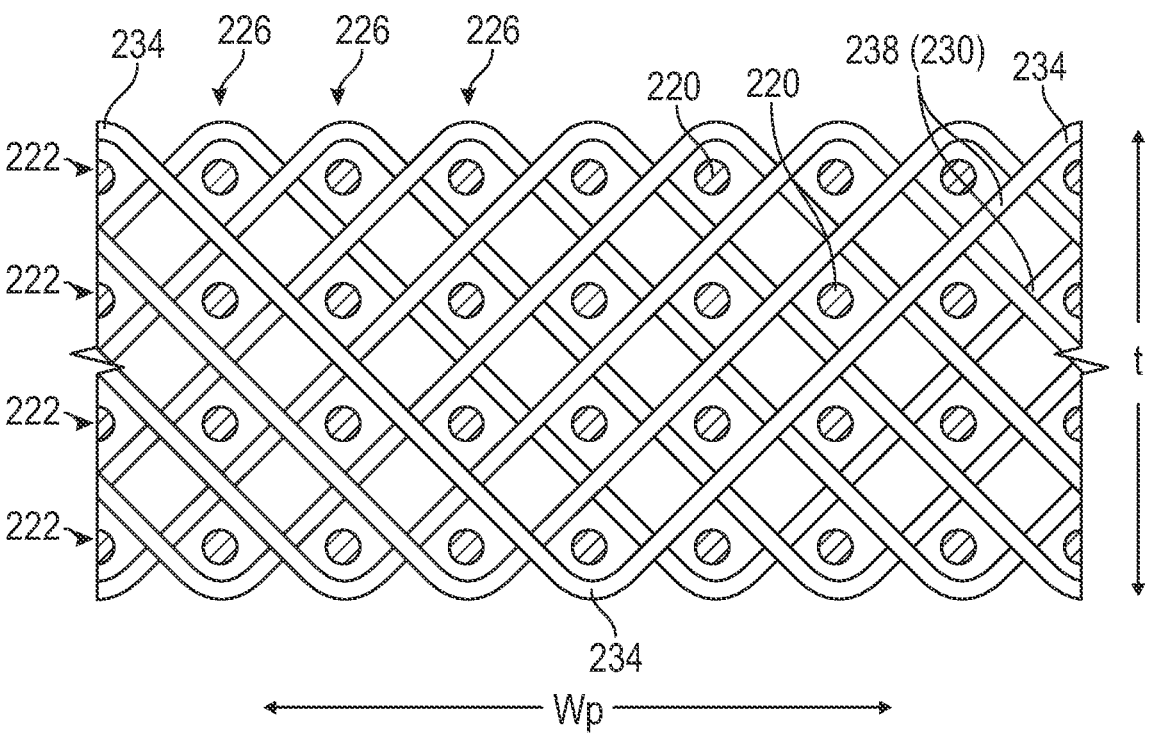
FIG. 2D is a schematic, cross-sectional view of a fiber weave pattern shown similar to fiber weave pattern shown in FIG. 2A, but with another interlocking fiber pattern, according to an aspect of the present disclosure.

Instead of extending orthogonally through the woven fabric 200, the angled interlocking fiber tows 236 form an oblique angle relative to the warp direction Wp. In the depicted embodiment, the angled interlocking fiber tows 236 extend through adjacent weft fiber layers 222 in an alternating or a sinusoidal pattern to interlock these adjacent layers with each other, with the oblique angle formed between adjacent turnaround portions 234 of the angled interlocking fiber tows 236. The turnaround portions 234 of the angled inter-locking fiber tows 236 are located on every other weft fiber columns 226, but, in other embodiments, two or more weft fiber columns 226 may be between adjacent turnaround portions 234 of the angled interlocking fiber tows 236. In other embodiments, the angled interlocking fiber tows 236 may extend between more than two adjacent weft fiber layers 222. For example, as shown in FIG. 2D, the inter-locking fiber tows 230 are through-thickness interlocking fiber tows, which are referred to herein as through-thickness angled interlocking fiber tows 238. FIG. 2D is a cross-sectional view of a woven fabric taken from a perspective similar to FIG. 2B. The weft fiber tows 220 are omitted in FIGS. 2C and 2D for clarity.

Figure 3:
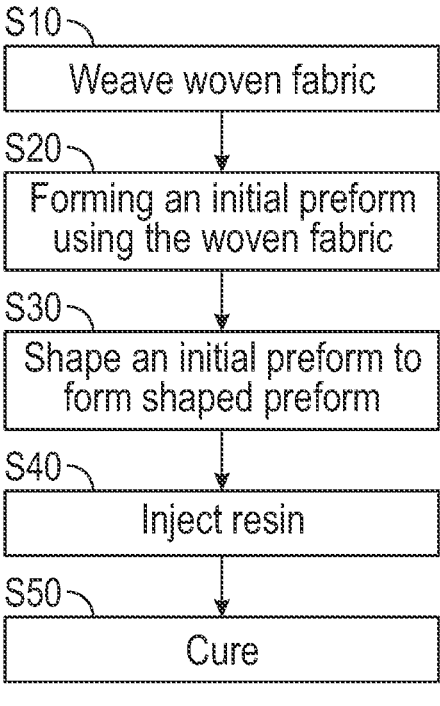
FIG. 3 is a flow chart of a general process for manufacturing a composite component that may be used in the turbine engine of FIG. 1, according to an aspect of the present disclosure.

FIG. 3 is a flow chart of a general process of manufacturing a composite component that may be used in the turbine engine of FIG. 1. The method includes, in step S10, weaving the woven fabric 200, such as on a loom. In step S20, the method includes forming an initial preform using one or more pieces of woven fabric 200. This step may include, for example, laying up a plurality of woven fabrics 200 or otherwise positioning the plurality of woven fabrics 200 relative to each other to form the initial preform. In step S30, the initial preform is shaped to form a shaped preform. Shaping the initial preform may include, for example, using a mold tool to shape the initial preform. Suitable shaping processes may include vacuum forming or other forming processes to impart a shape to the initial preform. The shaped preform may form a final preform, but optionally, additional machining processes and manufacturing processes, such as adding inserts, may be carried out on the shaped preform to form the final preform.

After the preform is complete (i.e., the final preform), a matrix material may be injected into the preform in step S40 to generate an infiltrated (or an impregnated) preform. When the composite component is a polymer matrix composite, polymers and/or a resin may be pumped into, injected into, or otherwise provided to a mold or a cavity to infiltrate or to impregnate the dry fibers in this step. This step may be done in conjunction with step S30 when using resin transfer molding (RTM) processes, for example. Other infiltration processes may be used in this step depending upon the matrix material. As noted above, the preform may be formed using prepreg fiber tows, and, in such an embodiment, this step (step S40) may be omitted.

The method continues with curing the infiltrated preform in step S50 to bond the composite material and, more specifically, the matrix together forming the composite component. The curing process depends upon the material and may include solidifying or otherwise hardening the matrix material around the fiber tows within the preform. For example, when the matrix material is a polymer, the curing may include both solidifying and chemically crosslinking the polymer chains. Curing the infiltrated preform can include several processes. For instance, an infiltrated preform may be debulked and cured by exposing the infiltrated preform to elevated temperatures and pressures in an autoclave. The infiltrated preform may also be subjected to one or more further processes, such as, e.g., a burn off cycle and a densification process. The curing step S50 may be done in conjunction with step S40, such as when the matrix material is injected into the final preform in a molten state and the curing step includes cooling the matrix material.

Further, the composite component may be finish machined as needed. Finish machining may define the final finished shape or contour of the composite component. For example, when the composite component is a fan blade 152 (FIG. 1), the edges of the fan blade 152 may be machined to define the final shape or the contour of the airfoil. Additionally, the composite component can be coated with one or more suitable coatings, such as, e.g., an environmental barrier coating (EBC) or a polyurethane surface coating.

Figure 4:
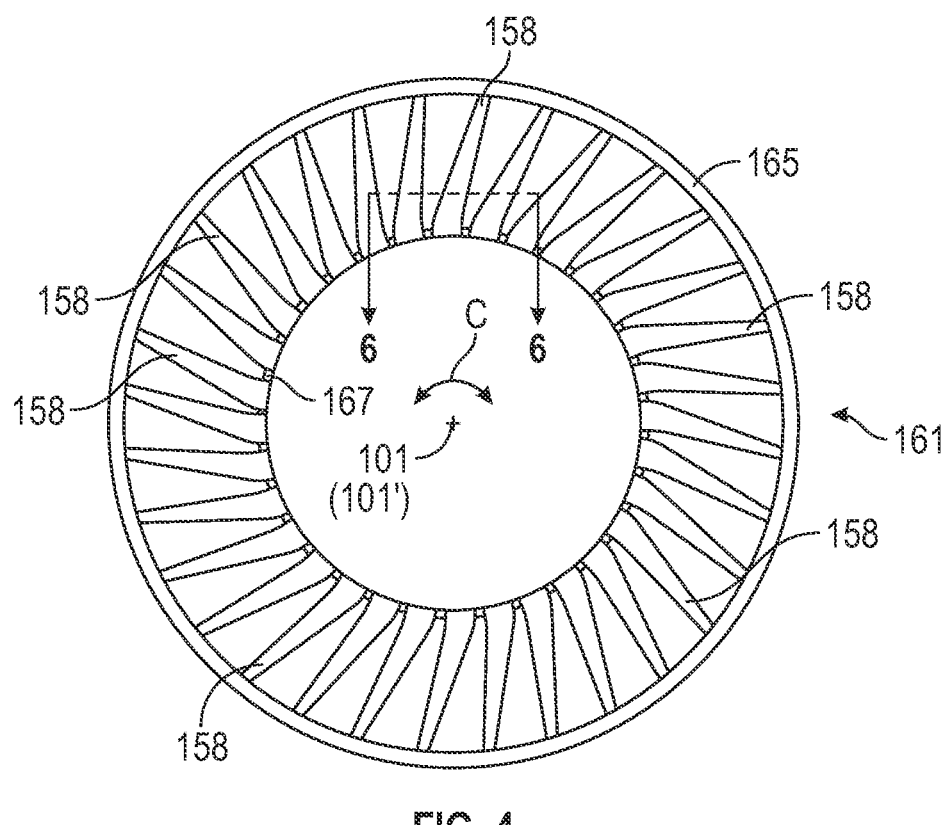
FIG. 4 is a schematic forward aft-looking view of a guide vane structure 161, taken at plane 4-4 of FIG. 1, according to an aspect of the present disclosure.
Figure 5:
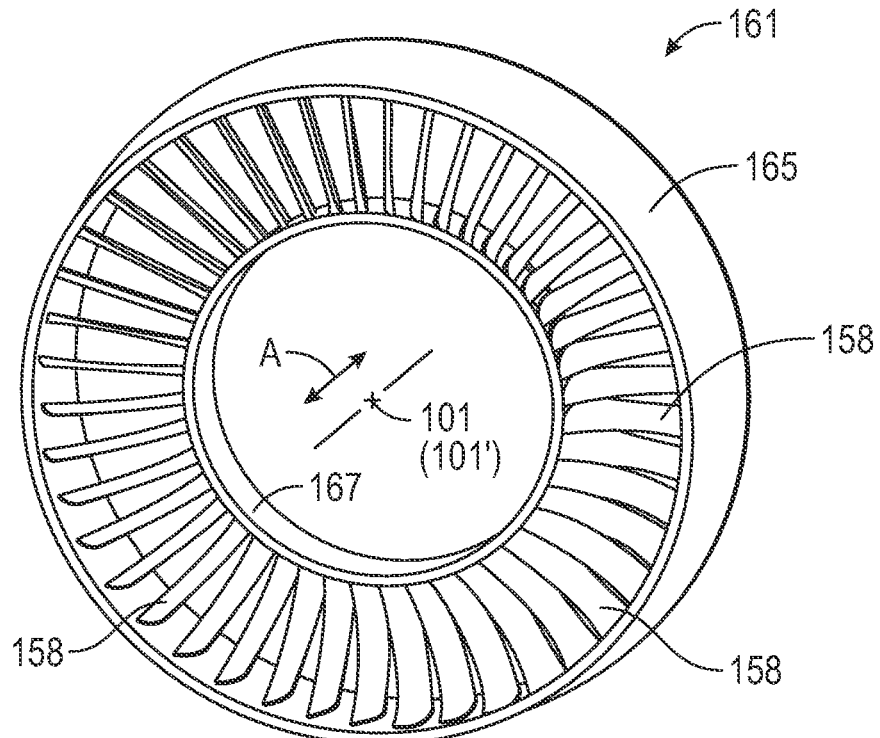
FIG. 5 is a schematic top aft-looking perspective view of the guide vane structure of FIG. 4, according to an aspect of the present disclosure.

FIG. 4 is a schematic forward aft-looking view of the guide vane structure 161, taken at plane 4-4 of FIG. 1, according to an aspect of the present disclosure. FIG. 5 is a schematic top aft-looking perspective view of the guide vane structure of FIG. 4, according to an aspect of the present disclosure. In FIG. 4 and FIG. 5, the guide vane structure 161 is shown as being an outlet guide vane structure that includes the guide vanes 158 of FIG. 1 and that is arranged downstream of the fan 150, but the present disclosure is equally applicable for other types of guide vane structures, including inlet guide vane structures, and stator vane structures that may be included within the compressor section 120 of the turbo-engine 104 or within the turbine section 130 of the turbo-engine 104. Referring collectively to FIG. 4 and FIG. 5, only the guide vane structure 161 is shown, with other elements of FIG. 1 (e.g., the nacelle 160 and the turbo-engine components within the outer casing 106) being omitted merely for clarity. As shown in FIG. 4, the guide vane structure 161 includes an outer shell 165 that extends circumferentially about an outlet guide vane structure centerline axis 101', which is congruent to the longitudinal centerline axis 101 of the turbine engine 100, and also extends in the axial direction A (FIG. 1). The guide vane structure 161 also includes an inner hub 167 that extends circumferentially about the outlet guide vane structure centerline axis 101' and that extends in the axial direction A. The plurality of guide vanes 158 extend between the outer shell 165 and the inner hub 167, and are circumferentially spaced apart from one another about the outlet guide vane structure centerline axis 101'. The guide vane structure 161 is an example of a composite component that may be implemented in the turbine engine 100 and a description of a composite outlet guide vane structure and a method of manufacturing the composite outlet guide vane structure as a composite component will be described in more detail below.

Figure 6:
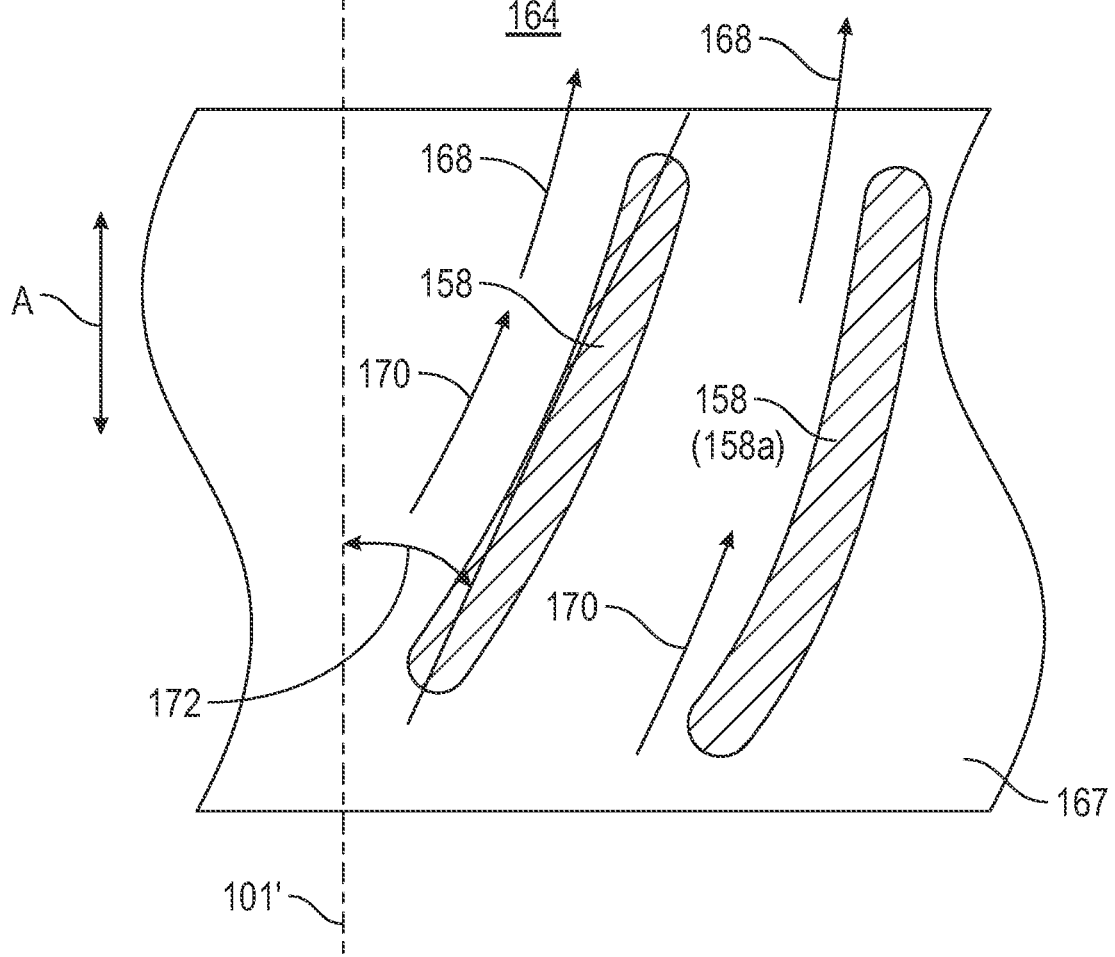
FIG. 6 is a cross-sectional view, taken at plane 6-6 of FIG. 4, through a guide vane of the guide vane structure, according to an aspect of the present disclosure.

FIG. 6 is a cross-sectional view, taken at plane 6-6 of FIG. 4, through an outlet guide vane of the outlet guide vane structure, according to an aspect of the present disclosure. As shown in FIG. 6, the guide vanes 158 may have an airfoil shape so as to define an airfoil vane structure 158a, and may include camber so as to be a curved outlet guide vane. In this manner, the guide vanes 158 can receive the swirled fan airflow 170 and redirect the swirled fan airflow 170 to be an axial airflow in the axial direction A and into the bypass airflow passage 164 as the bypass air 168. Each of the guide vanes 158 may be arranged at an angle 172 with respect to the centerline axis 101'.

Figure 7:
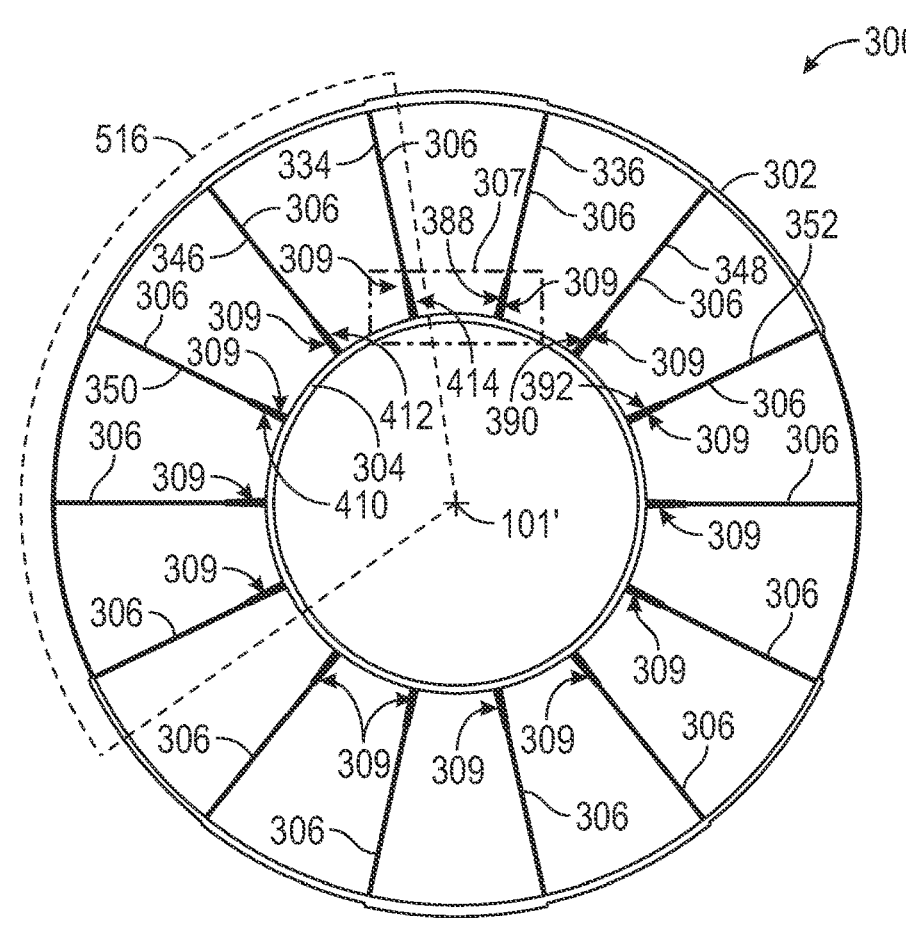
FIG. 7 is a schematic aft-looking layout of a preform assembly used in manufacturing a composite component, according to an aspect of the present disclosure.

FIG. 7 is a schematic aft-looking layout of a preform assembly 300 used in manufacturing a composite component, according to an aspect of the present disclosure. More particularly, the preform assembly 300 of FIG. 7 is configured for manufacturing a vane assembly, such as the guide vane structure 161 of FIG. 4 and FIG. 5. In FIG. 7, the preform assembly 300 includes an outer shell hoop preform 302, an inner hub hoop preform 304, and a plurality of bifurcated strut portions 306 that, as will be described below, are part of the outer shell hoop preform 302. Each of the bifurcated strut portions 306 extend between, and connect, the outer shell hoop preform 302 with the inner hub hoop preform 304.

Figure 8:
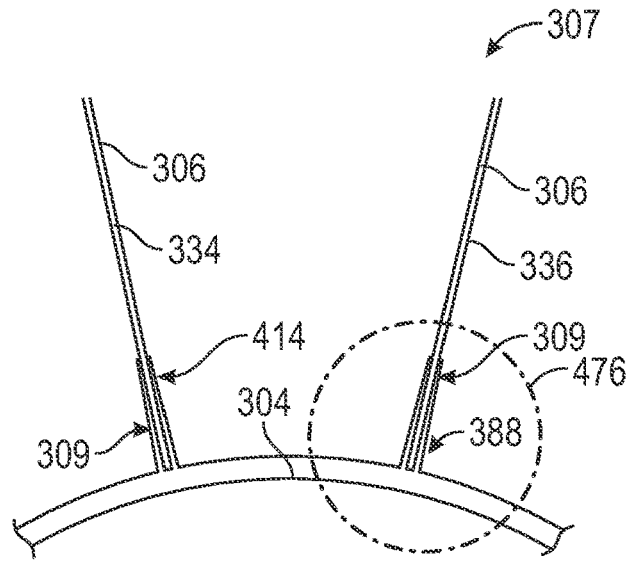
FIG. 8 is an enlarged detail view of a portion of the inner hub hoop preform and pi-joint connection, taken at detail view 307 of FIG. 7, according to an aspect of the present disclosure.

FIG. 8 is an enlarged detail view of a portion of the inner hub hoop preform 304 and pi-joint connections, taken at detail view 307 of FIG. 7, according to an aspect of the present disclosure. As will be described in more detail below, the inner hub hoop preform 304 includes a plurality of inner hub pi-joint members 309. As will also be described in more detail below, respective ones of the bifurcated strut portions 306 are connected with respective ones of the inner hub pi-joint members 309 so as to connect the outer shell hoop preform 302 (FIG. 7) and the inner hub hoop preform 304 via the plurality of bifurcated strut portions 306.

Returning to FIG. 7, the outer shell hoop preform 302 is shown to include fourteen bifurcated strut portions 306 extending between the outer shell hoop preform 302 and the inner hub hoop preform 304, and each bifurcated strut portion 306 corresponds to a respective guide vane 158 (FIG. 4) of a guide vane structure 161 (FIG. 4) for which the preform assembly 300 is utilized in manufacturing the guide vane structure 161. While FIG. 4 and FIG. 5 depict more than fourteen guide vanes 158, the depiction of fourteen bifurcated strut portions 306 in FIG. 7 is merely for brevity and clarity of the following description, and, in manufacturing the guide vane structure 161 of FIG. 4, the number of bifurcated strut portions 306 included in the preform assembly 300 would correspond to the number of guide vanes 158 included in the guide vane structure 161 of FIG. 4. As will be described below, the preform assembly 300 is assembled onto a mold tooling structure to manufacture the composite component utilizing the preform assembly 300.

Figure 9:
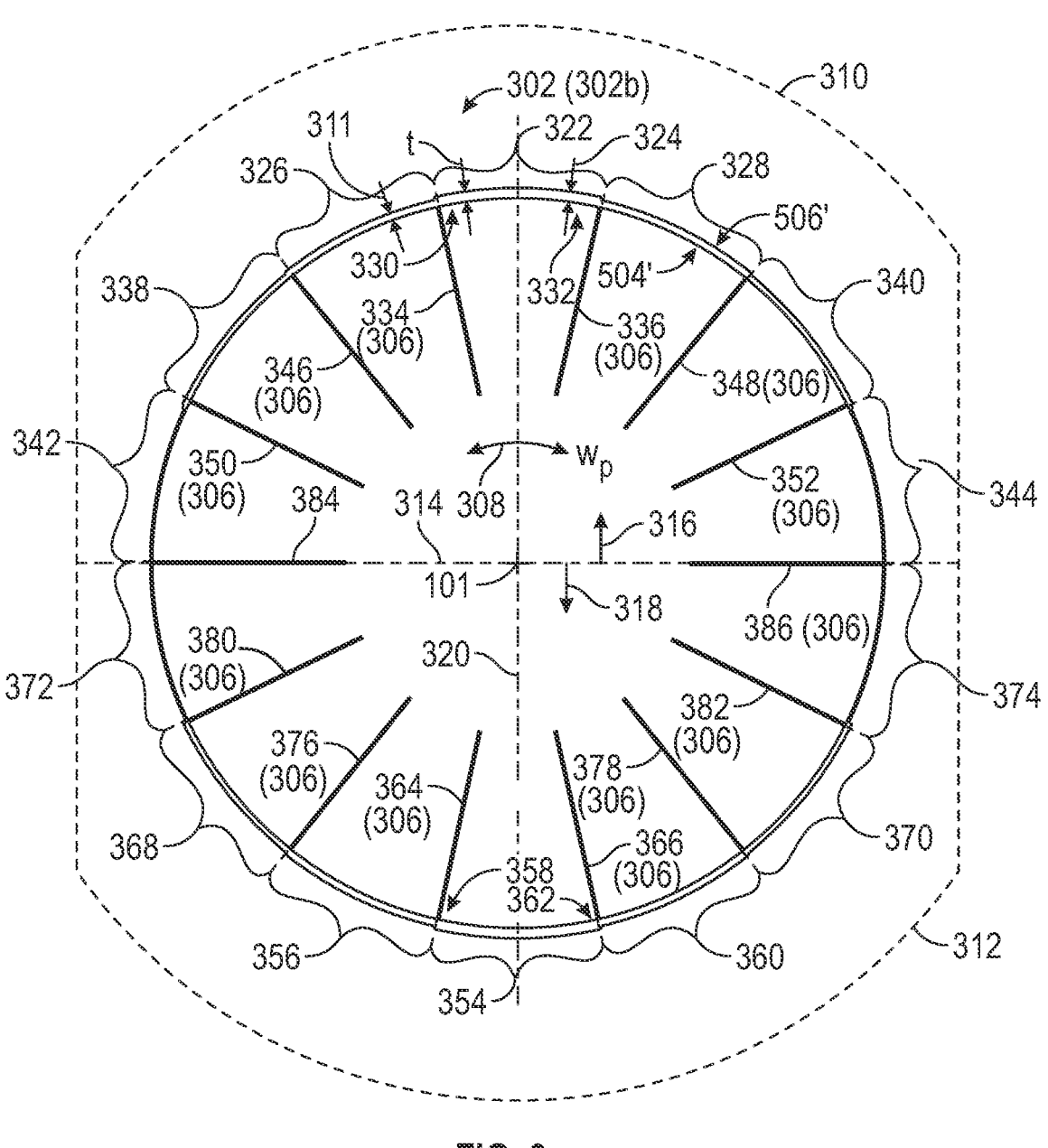
FIG. 9 is a schematic aft-looking layout of the outer shell hoop preform of FIG. 7, according to an aspect of the present disclosure.

FIG. 9 is a schematic aft-looking layout of the outer shell hoop preform 302 of FIG. 7, according to an aspect of the present disclosure. The outer shell hoop preform 302 may also be referred to as a woven outer shell hoop preform 302b, and the processing to obtain the woven outer shell hoop preform 302b will be described in more detail below with regard to FIG. 13 to FIG. 15. Referring to FIG. 9, the outer shell hoop preform 302 may be woven as a continuous three-dimensional outer shell hoop preform, and may be woven in accordance with any of the three-dimensional weaved structures of FIG. 2A to FIG. 2D. In weaving the three-dimensional weaved fabric for the outer shell hoop preform 302, warp fiber tows (e.g., warp fiber tows 210 of FIG. 2A and FIG. 2B) are woven to extend in a first direction, such as a hoop direction 308 (Wp), weft fiber tows (e.g., weft fiber tows 220 of FIG. 2A and FIG. 2B) are woven to extend in a second direction orthogonal to the first direction (e.g., in the axial direction A parallel to the centerline axis 101'), and interlocking fiber tows (e.g., interlocking fiber tows 230 of FIG. 2A and FIG. 2B) are woven in a third direction (e.g., a thickness direction 311 (t)).

In FIG. 9, the outer shell hoop preform 302 is woven with a first half portion 310 and a second half portion 312. The first half portion 310 is on an upper side 316 of a horizontal centerline 314, while the second half is on a lower side 318 of the horizontal centerline 314. The first half portion 310 of the woven outer shell hoop preform 302 is woven to include a first first-half portion 322 arranged in a middle of the first half portion 310 of the woven outer shell hoop preform 302. For example, the first first-half portion 322 is woven generally symmetrical across a vertical centerline axis 320. The first first-half portion 322 is also woven, in the thickness direction t, with a first thickness 324.

The first half portion 310 of the woven outer shell hoop preform 302 also includes a second first-half portion 326 adjacent to the first first-half portion 322 on a first side 330 of the first first-half portion 322, and a third first-half portion 328 adjacent to the first first-half portion 322 on a second side 332 of the first first-half portion 322. A first bifurcated strut portion 334 is woven between the first first-half portion 322 and the second first-half portion 326, and a second bifurcated strut portion 336 is woven between the first first-half portion 322 and the third first-half portion 328. The weaving of the first bifurcated strut portion 334 and the second bifurcated strut portion 336 during the weaving process of the outer shell hoop preform 302 will be described in more detail below, but, briefly, the first bifurcated strut portion 334 is woven as a bifurcated portion of the second first-half portion 326, and the second bifurcated strut portion 336 is woven as a bifurcated portion of the third first-half portion 328.

The outer shell hoop preform 302 of FIG. 9 further includes a fourth first-half portion 338 arranged adjacent to the second first-half portion 326, a fifth first-half portion 340 arranged adjacent to the third first-half portion 328, a sixth first-half portion 342 arranged adjacent to the fourth first-half portion 338, and a seventh first-half portion 344 arranged adjacent to the fifth first-half portion 340. A third bifurcated strut portion 346 is woven between the second first-half portion 326 and the fourth first-half portion 338, a fourth bifurcated strut portion 348 is woven between the third first-half portion 328 and the fifth first-half portion 340, a fifth bifurcated strut portion 350 is woven between the fourth first-half portion 338 and the sixth first-half portion 342, and a sixth bifurcated strut portion 352 is woven between the fifth first-half portion 340 and the seventh first-half portion 344. The weaving of each of the third bifurcated strut portion 346 to the sixth bifurcated strut portion 352 will also be described below.

The second half portion 312 of the woven outer shell hoop preform 302 is woven to include a first second-half portion 354 arranged in a middle of the second half portion 312 of the woven outer shell hoop preform 302. For example, the first second-half portion 354 is woven generally symmetrical across the vertical centerline axis 320. The first second-half portion 354 is also woven, in the thickness direction t, with the first thickness 324.

The second half portion 312 of the woven outer shell hoop preform 302 also includes a second second-half portion 356 adjacent to the first second-half portion 354 on a first side 358 of the first second-half portion 354, and a third second-half portion 360 adjacent to the first second-half portion 354 on a second side 362 of the first second-half portion 354. A seventh bifurcated strut portion 364 (which may also be referred to as a first bifurcated strut portion of the second half) is woven between the first second-half portion 354 and the second second-half portion 356, and an eighth bifurcated strut portion 366 (which may also be referred to as a second bifurcated strut portion of the second half) is woven between the first second-half portion 354 and the third second-half portion 360. The weaving of the seventh bifurcated strut portion 364 and the eighth bifurcated strut portion 366 during the weaving process of the outer shell hoop preform 302 will be described in more detail below.

The second half portion 312 of the outer shell hoop preform 302 of FIG. 9 further includes a fourth second-half portion 368 arranged adjacent to the second second-half portion 356, a fifth second-half portion 370 arranged adjacent to the third second-half portion 360, a sixth second-half portion 372 arranged adjacent to the fourth second-half portion 368, and a seventh second-half portion 374 arranged adjacent to the fifth second-half portion 370. A ninth bifurcated strut portion 376 (which may also be referred to as a third bifurcated strut portion of the second half) is woven between the second second-half portion 356 and the fourth second-half portion 368, a tenth bifurcated strut portion 378 (which may also be referred to as a fourth bifurcated strut portion of the second half) is woven between the third second-half portion 360 and the fifth second-half portion 370, an eleventh bifurcated strut portion 380 (which may also be referred to as a fifth bifurcated strut portion of the second half) is woven between the fourth second-half portion 368 and the sixth second-half portion 372, and a twelfth bifurcated strut portion 382 (which may also be referred to as a sixth bifurcated strut portion of the second half) is woven between the fifth second-half portion 370 and the seventh second-half portion 374. The weaving of each of the ninth bifurcated strut portion 376 to the twelfth bifurcated strut portion 382 will also be described below.

As further shown in FIG. 9, the outer shell hoop preform 302 includes a first end strut portion 384 that is woven between the sixth first-half portion 342 and the sixth second-half portion 372, and a second end strut portion 386 that is woven between the seventh first-half portion 344 and the seventh second-half portion 374. The weaving of each of the first end strut portion 384 and the second end strut portion 386 will also be described below.

While FIG. 9 depicts the outer shell hoop preform 302 as being woven with bifurcated strut portions 306 that are symmetrical for the first half portion 310 with the second half portion 312 across the horizontal centerline 314 such that both the first half portion 310 and the second half portion 312 have an equal number of bifurcated strut portions 306 that are equally spaced apart, the first half portion 310 and the second half portion 312 may be asymmetrical to one another instead. For example, the first half portion 310 may have a different number of bifurcated strut portions than the second half portion 312. Alternatively, although an equal number of bifurcated strut portions 306 may be included in both the first half portion 310 and the second half portion 312, the spacing between respective ones of the bifurcated strut portions 306 within their respective half portion may be different. The same type of asymmetry could also be implemented within the first half portion 310 itself across the vertical centerline axis 320. That is, within the first half portion 310, the number or spacing of the bifurcated strut portions 306 within a left half of the first half portion 310 may be different from the number or spacing of the bifurcated strut portions 306 within a right half of the first half portion 310. The same type of asymmetry across the vertical centerline axis 320 could also be implemented for the second half portion 312.

Figure 10:
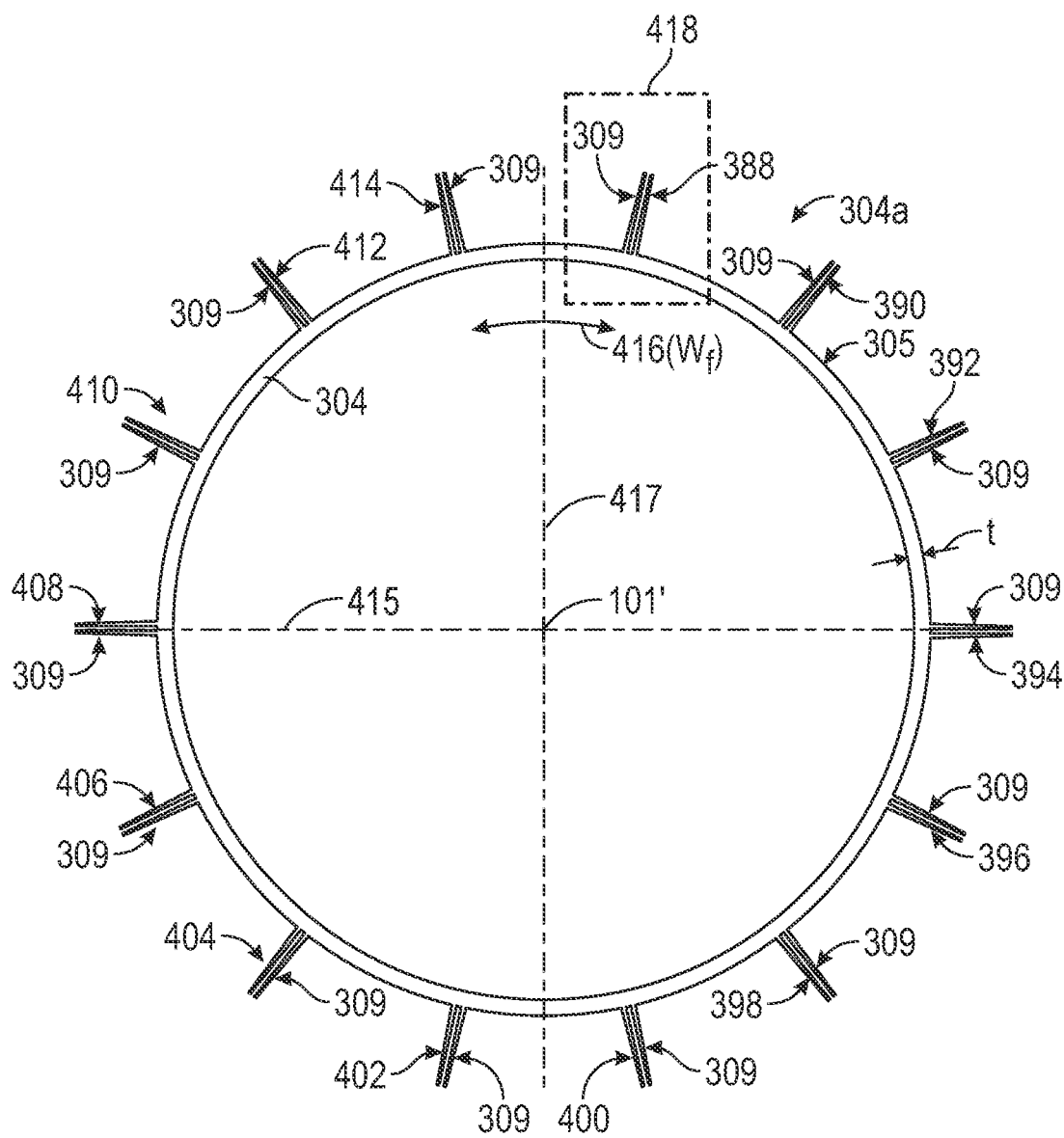
FIG. 10 is a schematic aft-looking layout of the inner hub hoop preform of FIG. 7, according to an aspect of the present disclosure.

FIG. 10 is a schematic aft-looking layout of the inner hub hoop preform 304 of FIG. 7, according to an aspect of the present disclosure. The inner hub hoop preform 304 is woven as a continuous three-dimensional inner hub hoop preform 304a, and may be woven as a three-dimensional fabric preform in accordance with any of the aspects described above in FIG. 2A to FIG. 2D. In the case when the inner hub hoop preform 304 is woven as the three-dimensional fabric preform, weft fiber tows 220 (FIG. 2A) are woven in an inner hub weft direction 416 (Wf), which is a hoop direction about the centerline axis 101', and warp fiber tows 210 (FIG. 2A) are woven in an inner hub warp direction (Wp), which is an axial direction parallel to the centerline axis 101', and interlocking fiber tows 230 (FIG. 2A) are woven in a thickness direction t (i.e., a radial direction with respect to the centerline axis 101'). The inner hub hoop preform 304 includes the plurality of inner hub pi-joint members 309 that each extends radially outwards from an outer side 305 of the inner hub hoop preform 304, including a first inner hub pi-joint member 388, a second inner hub pi-joint member 390, a third inner hub pi-joint member 392, a fourth inner hub pi-joint member 394, a fifth inner hub pi-joint member 396, a sixth inner hub pi-joint member 398, a seventh inner hub pi-joint member 400, an eight inner hub pi-joint member 402, a ninth inner hub pi-joint member 404, a tenth inner hub pi-joint member 406, an eleventh inner hub pi-joint member 408, a twelfth inner hub pi-joint member 410, a thirteenth inner hub pi-joint member 412, and a fourteenth inner hub pi-joint member 414. In the preform assembly 300 (FIG. 7), respective ones of the bifurcated strut portions 306 are connected with respective ones of the inner hub pi-joint members 309. For example, as shown in FIG. 7, the first bifurcated strut portion 334 is connected to the fourteenth inner hub pi-joint member 414, the second bifurcated strut portion 336 is connected to the first inner hub pi-joint member 388, the third bifurcated strut portion 346 is connected with the thirteenth inner hub pi-joint member 412, the fourth bifurcated strut portion 348 is connected with the second inner hub pi-joint member 390, the fifth bifurcated strut portion 350 is connected with the twelfth inner hub pi-joint member 410, and the sixth bifurcated strut portion 352 is connected with the third inner hub pi-joint member 392.

The inner hub hoop preform 304 may be woven to be symmetrical across a horizontal centerline axis 415, and, to also be symmetrical across a vertical centerline 417, as shown in FIG. 10. That is, the number and the spacing of the inner hub pi-joint members 309 about the inner hub hoop preform 304 may be equal across the horizontal centerline axis 415 and across the vertical centerline axis 417. Alternatively, in the case when the outer shell hoop preform 302 is woven with asymmetrical bifurcated strut portions 306 as described above with regard to FIG. 9, the inner hub hoop preform 304 is also woven with asymmetrical inner hub pi-joint members 309 to match the asymmetry of the bifurcated strut portions 306 of the outer shell hoop preform 302.

Figure 11A:
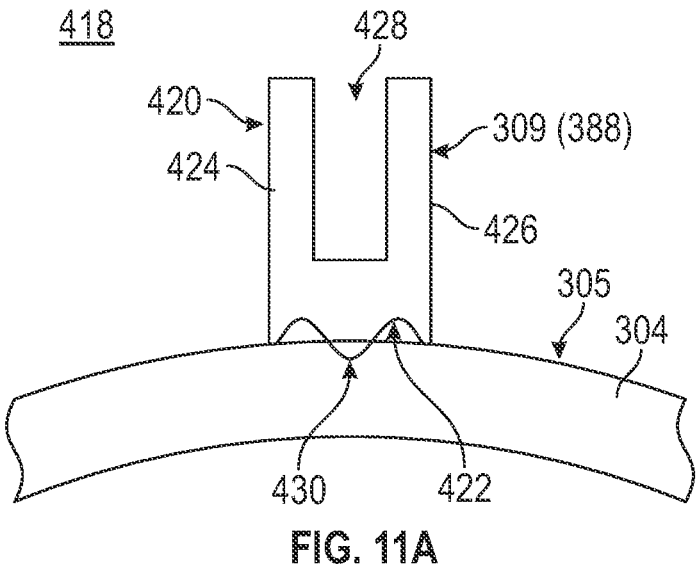
FIG. 11A is an enlarged forward aft-looking schematic view of a pi-joint member connection with the inner hub hoop preform, taken at detail view 418 of FIG. 10, according to an aspect of the present disclosure.

FIG. 11A is an enlarged forward aft-looking schematic view of the inner hub pi-joint member 309 and the inner hub hoop preform 304, taken at detail view 418 of FIG. 10, according to an aspect of the present disclosure. In FIG. 11A, the inner hub pi-joint member 309 is shown as a woven three-dimensional fabric pi-joint preform 420 that may be a continuous U-shaped preform that includes a base portion 422, a first strut connecting portion 424, and a second strut connecting portion 426, with a gap 428 being arranged between the first strut connecting portion 424 and the second strut connecting portion 426. The base portion 422 may be connected to the outer side 305 of the inner hub hoop preform 304 via a stitching 430. Each of the first inner hub pi-joint member 388 through the fourteenth inner hub pi-joint member 414 may be formed as shown in FIG. 11A.

Figure 11B:
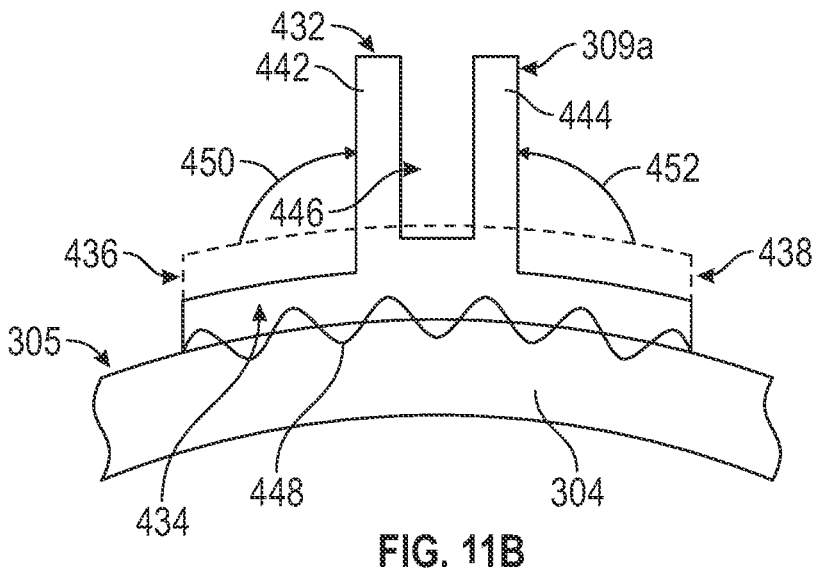
FIG. 11B is an enlarged forward aft-looking schematic view of an alternate pi-joint member and the inner hub hoop preform connection to that shown in FIG. 11A.

FIG. 11B is an enlarged forward aft-looking schematic view of an alternate pi-joint member and the inner hub hoop preform connection to that shown in FIG. 11A. In FIG. 11B, an alternate arrangement of an inner hub pi-joint member 309a is shown as a woven three-dimensional fabric pi-joint preform 432 that may be woven as a generally flat preform with a base portion 434, a first bifurcated portion 436 (shown with dashed lines), and a second bifurcated portion 438 (shown with dashed lines). The base portion 434 may be connected to the outer side 305 of the inner hub hoop preform 304 via a stitching 448. Alternatively, the base portion 434 may be woven integrally with the inner hub hoop preform 304, with the first bifurcated portion 436 and the second bifurcated portion 438 being bifurcated from the integrally woven base portion 434. With this alternative, the inner hub hoop preform 304 may be woven with bifurcated inner hub pi-joint members 309a similar to the bifurcated strut portions 306 described below for the weaving of the outer shell hoop preform 302. The first bifurcated portion 436 may be raised (shown schematically by arrow 450) from the base portion 434 to extend radially outward from the base portion 434 so as to define a first strut connecting portion 442. Similarly, the second bifurcated portion 438 may be raised (shown schematically by arrow 452) from the base portion 434 to extend radially outward from the base portion 434 so as to define a second strut connecting portion 444, with a gap 446 being arranged between the first strut connecting portion 442 and the second strut connecting portion 444. Each of the first inner hub pi-joint member 388 through the fourteenth inner hub pi-joint member 414 (FIG. 10) may be formed as shown in FIG. 11B.

Figure 11C:
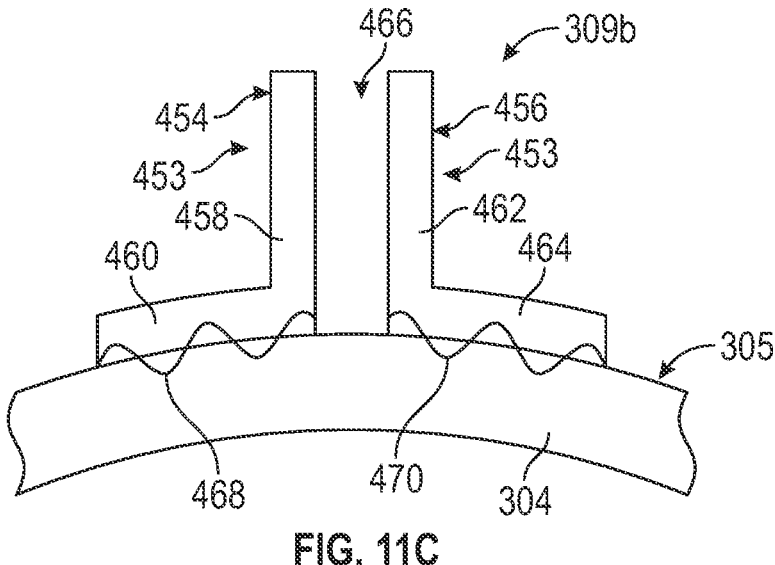
FIG. 11C is an enlarged forward aft-looking schematic view of another alternate pi-joint member and the inner hub hoop preform connection to that shown in FIG. 11A.

FIG. 11C is an enlarged forward aft-looking schematic view of another alternate pi-joint member and the inner hub hoop preform connection to that shown in FIG. 11A. In FIG. 11C, an alternate arrangement of an inner hub pi-joint member 309b is shown as including two separate woven three-dimensional fabric pi-joint preforms 453 that may each be woven as an L-shaped pi-joint preform. Thus, the inner hub pi-joint member 309b may include a first L-shaped pi-joint member 454 that includes a first base portion 460 and a first strut connecting portion 458, and a second L-shaped pi-joint member 456 that includes a second base portion 464 and a second strut connecting portion 462. The first L-shaped pi-joint member 454 and the second L-shaped pi-joint member 456 are separated by a gap 466, which may be similar to the gap 446 (FIG. 11B) or the gap 428 (FIG. 11A). The first base portion 460 may be connected to the outer side 305 of the inner hub hoop preform 304 via a stitching 468, and the second base portion 464 may be connected to the outer side 305 of the inner hub hoop preform 304 via a stitching 470. Alternatively, each of the first base portion 460 and the second base portion 464 may be woven or braided to be integral with the three-dimensional woven fabric of the inner hub hoop preform 304 rather than being connected to the outer side 305 of the inner hub hoop preform 304. Each of the first inner hub pi-joint member 388 through the fourteenth inner hub pi-joint member 414 (FIG. 10) may be formed as shown in FIG. 11C.

Figure 12:
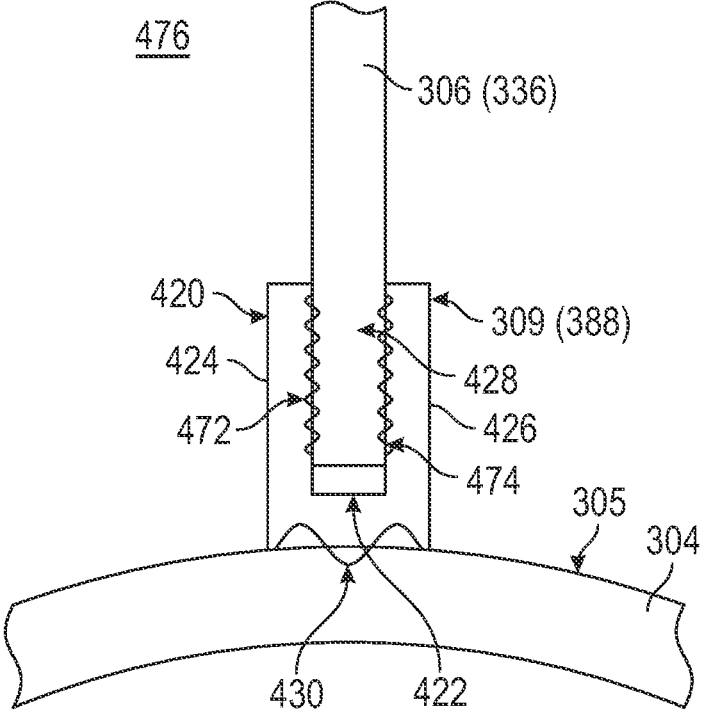
FIG. 12 is an enlarged view of a bifurcated strut portion connection with an inner hub pi-joint member, taken at detail view 476 of FIG. 8, according to an aspect of the present disclosure.

FIG. 12 is an enlarged view of a bifurcated strut portion connection with an inner hub pi-joint member, taken at detail view 476 of FIG. 8, according to an aspect of the present disclosure. In FIG. 12, a connection of the second bifurcated strut portion 336 with the first inner hub pi-joint member 388 is depicted, but the arrangement of FIG. 12 is also applicable to each of the other connections of the bifurcated strut portion to inner hub pi-joint member to obtain the preform assembly 300 of FIG. 7. The first inner hub pi-joint member 388 of FIG. 12 is shown as constituting the inner hub pi-joint member 309 arrangement of FIG. 11A, but the pi-joint member in FIG. 12 may constitute any of the inner hub pi-joint members 309a of FIG. 11B, or the inner hub pi-joint member 309b of FIG. 11C instead. As shown in FIG. 12, the second bifurcated strut portion 336 is inserted into the gap 428 of the first inner hub pi-joint member 388 between the first strut connecting portion 424 and the second strut connecting portion 426. The second bifurcated strut portion 336 is then connected to the first inner hub pi-joint member 388. According to one aspect as shown in FIG. 12, the second bifurcated strut portion 336 may be connected to the first strut connecting portion 424 via a stitching 472, and the second bifurcated strut portion 336 may be connected to the second strut connecting portion 426 via a stitching 474. Of course, other means besides stitching (e.g., tacking) may be implemented to connect the second bifurcated strut portion 336 with the first inner hub pi-joint member 388.

Figures 13, 14:
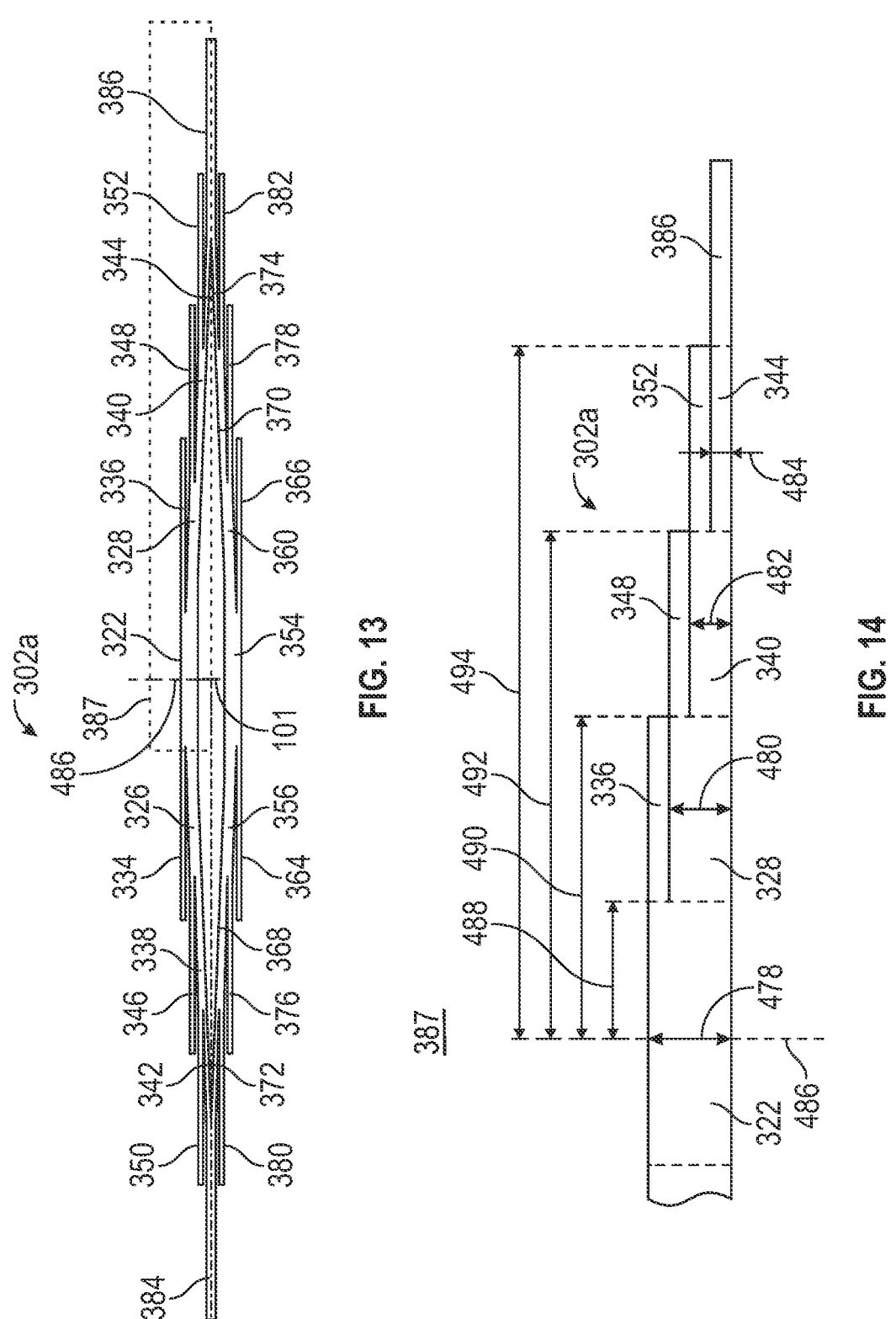
FIG. 13 is a schematic forward aft-looking view of the outer shell hoop preform in a flattened state, according to an aspect of the present disclosure.
FIG. 14 is an enlarged view of a portion of the outer shell hoop preform taken at detail view 387 of FIG. 13, according to an aspect of the present disclosure.

FIG. 13 is a schematic forward aft-looking view of an initial outer shell hoop preform 302a in a flattened state, according to an aspect of the present disclosure. FIG. 14 is an enlarged view of a portion of the initial outer shell hoop preform 302a, taken at detail view 387 of FIG. 13, according to an aspect of the present disclosure. The initial outer shell hoop preform 302a is generally woven in a flattened state and may appear as shown in FIG. 13 upon completion of the weaving. In FIG. 14, in weaving the three-dimensional outer shell hoop preform fabric, a center portion (i.e., the first first-half portion 322) of the initial outer shell hoop preform 302a is generally woven with a first thickness 478. The first first-half portion 322 is bifurcated a first distance 488 from a centerline 486 (corresponding to the location of the centerline axis 101' of FIG. 7) and the second bifurcated strut portion 336 is woven starting at the first distance 488. The third first-half portion 328 then begins at the first distance 488 and is woven with a second thickness 480 that is less than the first thickness 478. The third first-half portion 328 is bifurcated a second distance 490 from the centerline 486 and the fourth bifurcated strut portion 348 is woven starting at the second distance 490. The fifth first-half portion 340 then begins at the second distance 490 and is woven with a third thickness 482 that is less than the second thickness 480. The fifth first-half portion 340 is bifurcated a third distance 492 from the centerline 486 and the sixth bifurcated strut portion 352 is woven starting at the third distance 492. The seventh first-half portion 344 is woven with a fourth thickness 484 that is less than the third thickness 482. The second end strut portion 386 is woven together with the seventh first-half portion 344 so as to have the same fourth thickness 484, and the second end strut portion 386 begins at a fourth distance 494 from the centerline 486. Thus, as is shown in FIG. 14, each first-half portion has a different thickness due to the successive bifurcations of each first-half portion.

While FIG. 14 depicts one half of the first half portion 310 of the initial outer shell hoop preform 302a, the remainder of the first half portion 310 on an opposite side of the centerline 486 (i.e., the side containing the second first-half portion 326, the fourth first-half portion 338, the sixth first-half portion 342, and the first end strut portion 384) is woven as a mirror image to that depicted in FIG. 14. Further, the second half portion 312 of the initial outer shell hoop preform 302a is woven as a mirror image to the first half portion 310 of the initial outer shell hoop preform 302a. Of course, in the case when the initial outer shell hoop preform 302a is woven with the asymmetrical bifurcated strut portions 306 as described above with regard to FIG. 9, the remainder of the first half portion 310 on the opposite side of the centerline 486 is not woven as a mirror image. Likewise, in the case when the initial outer shell hoop preform 302a is woven with the asymmetrical bifurcated strut portions 306, the second half portion 312 is not woven as a mirror image to the first half portion 310.

Figure 15:
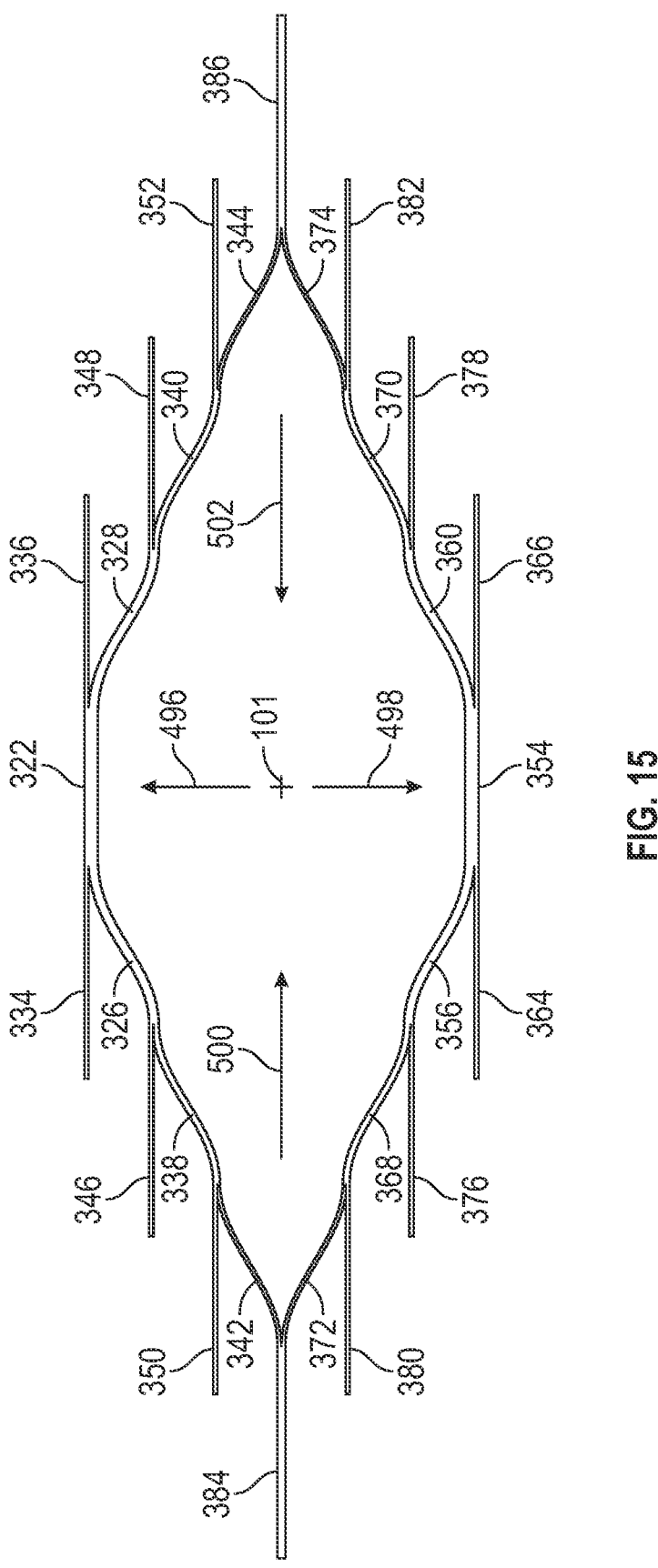
FIG. 15 is a schematic forward aft-looking view of the outer shell hoop preform in a partial open state, according to an aspect of the present disclosure.

FIG. 15 is a schematic forward aft-looking view of the initial outer shell hoop preform 302a in a partial open state, according to an aspect of the present disclosure. In the manufacturing process, in FIG. 15, the flattened initial outer shell hoop preform 302a of FIG. 13 is opened by translating the first first-half portion 322 in a first vertical direction 496 away from the centerline axis 101, and translating the first second-half portion 354 in a second vertical direction 498 opposite to the first vertical direction 496 away from the centerline axis 101. In addition, the first end strut portion 384 of the initial outer shell hoop preform 302a is translated in a first horizontal direction 500 toward the centerline axis 101, and the second end strut portion 386 of the initial outer shell hoop preform 302a is translated in a second horizontal direction 502 toward the centerline axis 101. Further, each of the first bifurcated strut portion 334 through the twelfth bifurcated strut portion 382 is translated away from their respective first half or second half portions.

Figure 16:
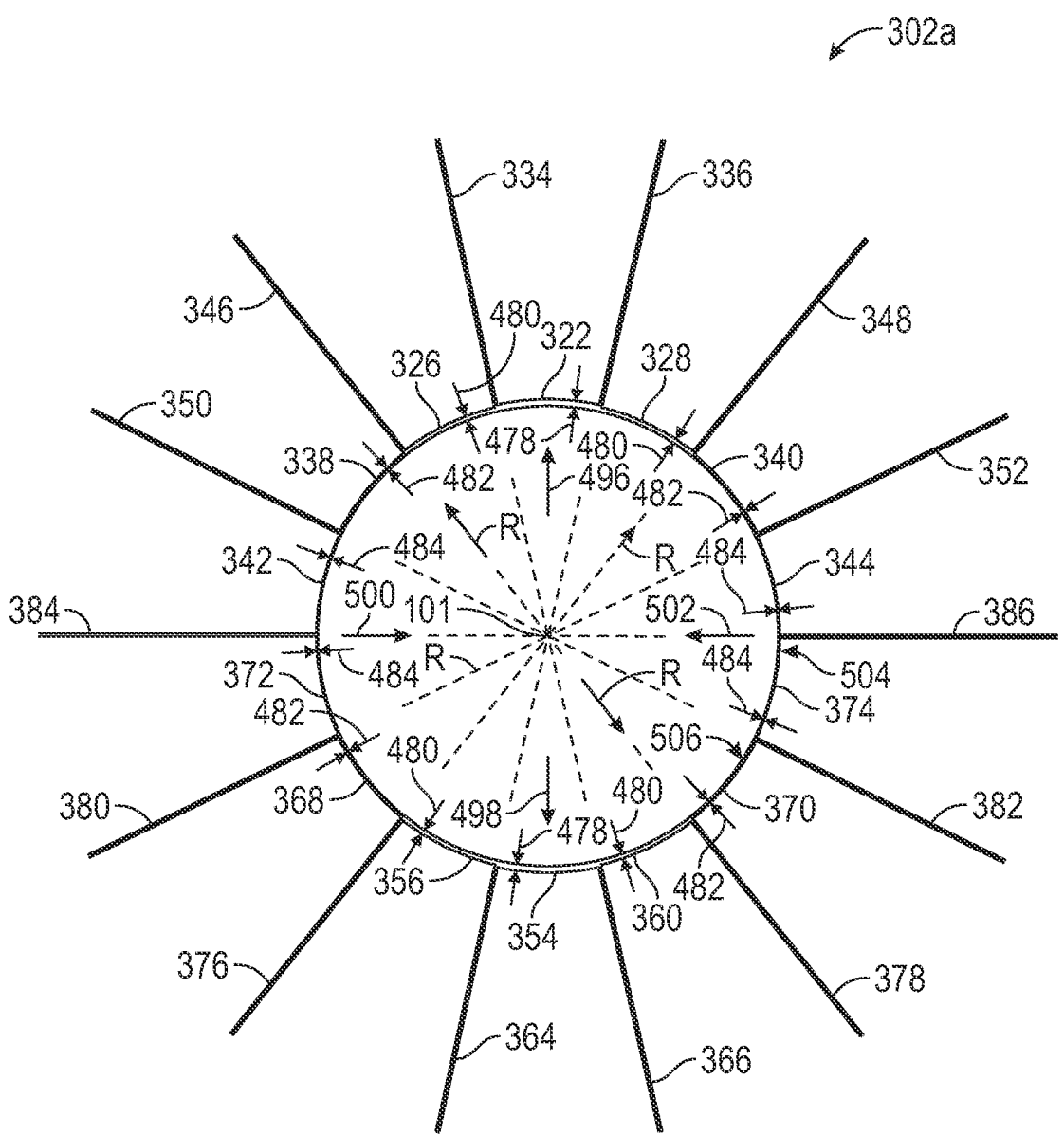
FIG. 16 is a schematic forward aft-looking view of the outer shell hoop preform in an open state, according to an aspect of the present disclosure.

FIG. 16 is a schematic forward aft-looking view of the initial outer shell hoop preform 302a in an open state (i.e., opened from being the flattened preform of FIG. 13), according to an aspect of the present disclosure. In FIG. 16, the partial-open initial outer shell hoop preform 302a of FIG. 15 is fully opened by further translating the first first-half portion 322 in the first vertical direction 496 away from the centerline axis 101, and by further translating the first second-half portion 354 in the second vertical direction 498 opposite to the first vertical direction 496 away from the centerline axis 101. In addition, the first end strut portion 384 of the outer shell hoop preform 302 is further translated in the first horizontal direction 500 toward the centerline axis 101, and the second end strut portion 386 of the initial outer shell hoop preform 302a is further translated in the second horizontal direction 502 toward the centerline axis 101. Thus, the initial outer shell hoop preform 302a is fully opened so as to generally be arranged in a circular manner. Further, each of the first bifurcated strut portion 334 through the twelfth bifurcated strut portion 382 is further translated (i.e., rotated) away from their respective first half or second half portions such that each bifurcated strut portion generally extends in a radial direction R, with respect to the centerline axis 101, from an exterior side 504 of the initial outer shell hoop preform 302a. Here, the exterior side 504 is with reference to the state of the initial outer shell hoop preform 302a as shown in FIG. 16 when the initial outer shell hoop preform 302a has been woven and is being manipulated for installation onto a mold tooling structure (described below). Thus, in FIG. 16, an interior side 506 of the initial outer shell hoop preform 302a is depicted as being opposite the exterior side 504. Then, during the manufacturing process, the initial outer shell hoop preform 302a as shown in FIG. 16 is turned inside-out to obtain the woven outer shell hoop preform 302b (FIG. 9) such that the exterior side 504 of the initial outer shell hoop preform 302a is an interior side 504' of the woven outer shell hoop preform 302b (FIG. 9) and the interior side 506 of the initial outer shell hoop preform 302a is an exterior side 506' of the woven outer shell hoop preform 302b (FIG. 9), and each of the bifurcated strut portions (i.e., the first bifurcated strut portion 334 through the twelfth bifurcated strut portion 382), along with the first end strut portion 384 and the second end strut portion 386, is arranged on the interior side 504' of the woven outer shell hoop preform 302b to extend inward (i.e., to extend toward the centerline axis 101). The result, after turning the initial outer shell hoop preform 302a of FIG. 16 inside-out, is the woven outer shell hoop preform 302b as shown in FIG. 9.

Figure 17:
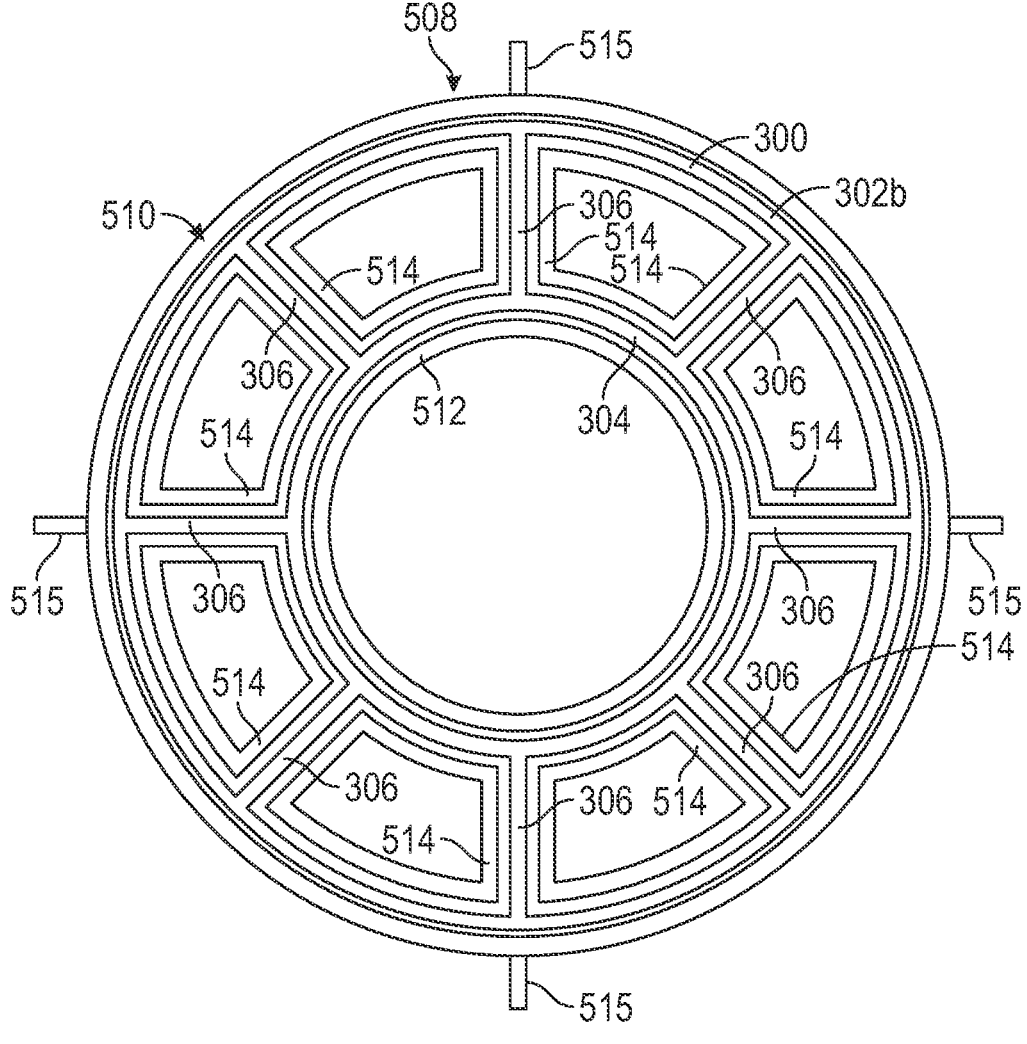
FIG. 17 is a schematic view of a mold tooling structure that may be utilized in manufacturing the guide vane structure of FIG. 4, according to an aspect of the present disclosure.

FIG. 17 is a schematic view of a mold tooling structure 508 that may be utilized in manufacturing the guide vane structure 161 of FIG. 4, according to an aspect of the present disclosure. The mold tooling structure 508 includes an outer shell mold portion 510 for forming the outer shell 165 (FIG. 4), an inner hub mold portion 512 for forming the inner hub 167 (FIG. 4), and a plurality of strut mold portions 514 for forming the guide vanes (struts) 158. The preform assembly 300 is formed and assembled as described above with regard to any of FIGS. 7 to 16, and the preform assembly 300 may be assembled utilizing the mold tooling structure 508. For example, the woven outer shell hoop preform 302b and each of the bifurcated strut portions may be assembled onto the outer shell mold portion 510 and the strut mold portions 514, and the inner hub hoop preform 304 may be assembled onto the inner hub mold portion 512, and then each of the bifurcated strut portions 306 may be connected to the inner hub hoop preform 304 via the inner hub pi-joint members 309 (FIG. 7). The mold tooling structure 508 also includes one or more injectors 515 through which a matrix material (as described above) may then be injected into the mold tooling structure 508 to generate an impregnated preform assembly within the mold tooling structure 508. A curing process may then be applied to the impregnated preform assembly within the mold tooling structure 508. For example, the mold tooling structure 508 may include the ability to apply pressure and heat to the impregnated preform assembly to apply the curing process, or the mold tooling structure 508 may be provided to an autoclave to institute a curing process.

Figures 18, 19:
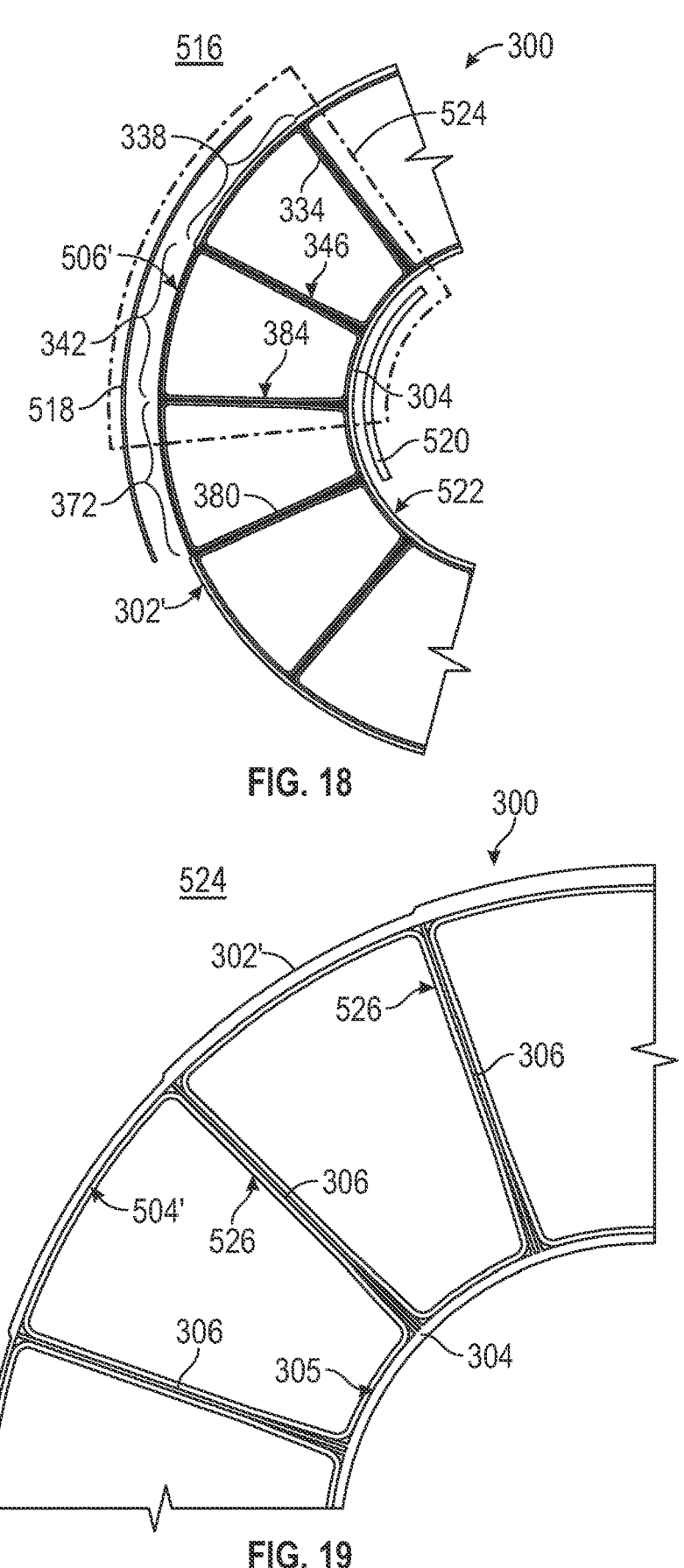
FIG. 18 is an enlarged view of a portion of the preform assembly of FIG. 7, taken at detail view 516 of FIG. 7, according to an aspect of the present disclosure.
FIG. 19 is an enlarged view of a portion of the preform assembly of FIG. 18, taken at detail view 524 of FIG. 18, according to an aspect of the present disclosure.

FIG. 18 is an enlarged view of a portion of the preform assembly 300 of FIG. 7, taken at detail view 516 of FIG. 7, according to an aspect of the present disclosure. In FIG. 18, one or more additional preform layers 518 may be added to an exterior side 506' of the outer shell hoop preform 302. The one or more additional preform layers 518 may be added to increase a thickness of the outer shell hoop preform 302, particularly, for the portions having a thickness that is less than the first thickness 478 (FIG. 14), but, also to the portions that have the first thickness 478. The additional preform layers 518 may be assembled to the preform assembly 300 either before, or after, being installed onto the mold tooling structure 508. In adding the additional preform layers 518 before the outer shell hoop preform 302 is installed onto the mold tooling structure 508, one or more additional preform layers 518 may be woven to the second first-half portion 326 and to the third first-half portion 328 to build up the second thickness 480 to the first thickness 478. Similarly, one or more additional preform layers 518 may be woven to the fourth first-half portion 338 and to the fifth first-half portion 340 to build up the third thickness 482 to the first thickness 478. Further, one or more additional preform layers 518 may be woven to the sixth first-half portion 342 and the seventh first-half portion 344 to build up the fourth thickness 484 to the first thickness 478. The thickness of each portion of the second half portion 312 may also be similarly built-up by weaving the additional preform layers 518 thereto. As a result, a constant thickness (i.e., the first thickness 478) may be obtained for the outer shell preform 302 prior to the outer shell preform 302 being installed onto the mold tooling structure 508. The additional preform layers 518 may be either three-dimensional preform layers, or may be two-dimensional preform layers. Further, one or more additional preform layers 520 may be added to the inner hub hoop preform 304 by being layered onto an inner side 522 of the inner hub hoop preform 304. The additional preform layers 520 may also be added to the inner hub hoop preform 304 either before, or after the inner hub hoop preform 304 is installed onto the mold tooling structure

508. The additional preform layers 520 may also be either three-dimensional preform layers, or two-dimensional preform layers.

FIG. 19 is an enlarged view of a portion of the preform assembly 300 of FIG. 18, taken at detail view 524 of FIG. 18, according to an aspect of the present disclosure. In FIG. 19, one or more additional vane preform layers 526 may be added to each of the bifurcated strut portions 306, in-between respective ones of the bifurcated strut portions 306 along the interior side 504' of the outer shell hoop preform 302, and along the outer side 305 of the inner hub hoop preform 304. The additional vane preform layers 526 may be in the form of a woven or braided sock that may be added to thicken the bifurcated strut portions 306 and also to build and to form a vane airfoil structure for each of the guide vanes 158 (FIG. 4).

FIG. 20 is a flowchart of process steps for implementing a method of manufacturing a composite component, according to an aspect of the present disclosure. In step S2001, the initial outer shell hoop preform 302a is woven with the bifurcated strut portions 306 as described above with regard to FIG. 9 and FIG. 13 to FIG. 16. In step S2002, the inner hub hoop preform 304 is woven, and the plurality of inner hub pi-joint members 309 are woven, as described above with regard to FIG. 10. In step S2003, each of the woven inner hub pi-joint members 309 is connected to the inner hub hoop preform 304 as described above with regard to any of FIG. 11A to FIG. 11C. In step S2004, the woven inner hub hoop preform with the inner hub pi-joint members 309 is installed onto the mold tooling structure 508 (FIG. 17). While step S2003 provides for connecting the inner hub pi-joint members 309 to the inner hub hoop preform 304 before the installing of step S2004, the inner hub hoop preform 304 may instead be installed onto the mold tooling structure 508 and then each of the inner hub pi-joint members 309 may be connected to the inner hub hoop preform 304.

In step S2005, as was described above with regard to FIG. 13 to FIG. 16, the initial outer shell hoop preform 302a is turned inside-out so as to obtain the woven outer shell hoop preform 302b as shown in FIG. 9. Then, in step S2006, the woven outer shell hoop preform 302b is installed onto the mold tooling structure 508. In step S2007, respective ones of the bifurcated strut portions 306 are inserted into respective ones of the inner hub pi-joint members 309 and are connected to the respective inner hub pi-joint member 309 as described above with regard to FIG. 12.

Next, in step S2008, as shown in FIG. 18 and FIG. 19, the additional preform layers 518, the additional preform layers 520, and the additional vane preform layers 526 can be overlayed onto the preform assembly 300 so as to build-up the preform structure for the composite component part being formed. In step S2009, a process to inject a matrix material into the mold tooling structure 508 is performed. The matrix material may be any of those described herein. Any one or more of various known processes of injecting matrix materials into a mold for forming a composite component can be implemented. Then, in step S2010, a curing process is applied to the mold tooling structure 508 as described with regard to FIG. 17. Finally, in step S2011, once the curing process has been completed, the cured composite component part can be removed from the mold tooling structure 508, and any additional manufacturing processes that may be needed to complete the composite component part (i.e., to complete the vane structure 161 of FIG. 4) can be performed.

The foregoing aspects provide a technique for manufacturing a three-dimensional woven preform structure for a vane structure of a gas turbine engine. The process of weaving a continuous three-dimensional fabric preform for the outer shell hoop preform by including the bifurcated strut portions allows for an easier weaving process. The flattened woven outer shell hoop preform can then be readily turned inside-out so as to obtain the outer shell hoop preform with the bifurcated strut portions arranged extending inward so that the outer shell hoop preform can then be installed onto the mold tooling structure and joined with the inner hub hoop preform via the pi-joint members.

Further aspects of the present disclosure are provided by the subject matter of the following clauses.

A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method including weaving an initial outer shell hoop preform including a plurality of bifurcated strut portions on an exterior side of the initial outer shell hoop preform, turning the initial outer shell hoop preform inside-out to form a woven outer shell hoop preform such that an exterior side of the initial outer shell hoop preform is an interior side of the woven outer shell hoop preform and the bifurcated strut portions are arranged on the interior side of the woven outer shell hoop preform to extend inward, installing the woven outer shell hoop preform onto a mold tooling structure, installing an inner hub hoop preform onto the mold tooling structure, the inner hub hoop preform including a plurality of inner hub pi-joint members arranged on an outer side of the inner hub hoop preform, inserting respective ones of the plurality of bifurcated strut portions of the woven outer shell hoop preform into respective ones of the plurality of inner hub pi-joint members, and connecting the respective ones of the plurality of bifurcated strut portions to the respective ones of the plurality of inner hub pi-joint members, injecting a matrix material into the mold tooling structure, and applying a curing process to the mold tooling structure to obtain a molded composite component.

The method according to the preceding clause, wherein the composite component is one of an outlet guide vane structure, an inlet guide vane structure, or a stator vane structure.

The method according to any preceding clause, wherein the initial outer shell hoop preform is woven in a flattened state, and is opened to an open state with the bifurcated strut portions extending outward from the exterior side of the initial outer shell hoop preform prior to turning the initial outer shell hoop preform inside-out.

The method according to any preceding clause, wherein one or more additional preform layers is added to at least one of an interior side of the woven outer shell hoop preform between a respective pair of the bifurcated strut portions, or to an outer side of the inner hub hoop preform between the respective pair of the bifurcated strut portions.

The method according to any preceding clause, wherein one or more additional vane preform layers is added to at least one of the plurality of bifurcated strut portions.

The method according to any preceding clause, wherein the one or more additional vane preform layers are added to form a vane airfoil structure.

The method according to any preceding clause, wherein the one or more additional vane preform layers is at least one of a three-dimensional preform layer or a two-dimensional preform layer.

The method according to any preceding clause, wherein the initial outer shell hoop preform is woven as a continuous three-dimensional outer shell hoop preform, and the inner hub hoop preform is woven as a continuous three-dimensional inner hub hoop preform.

The method according to any preceding clause, wherein, in weaving of the continuous three-dimensional inner hub hoop preform, weft fiber tows are woven in a hoop direction and warp fiber tows are woven in an axial direction, and, in the weaving of the continuous three-dimensional initial outer shell hoop preform, warp fiber tows are woven in the hoop direction and weft fiber tows are woven in the axial direction.

The method according to any preceding clause, further comprising weaving the inner hub hoop preform as the continuous three-dimensional inner hub hoop preform, and connecting the plurality of inner hub pi-joint members to the woven inner hub hoop preform, the plurality of inner hub pi-joint members extending outward from the outer side of the woven inner hub hoop preform.

The method according to any preceding clause, wherein each of the plurality of inner hub pi-joint members is a three-dimensional woven fabric pi-joint preform including a first strut connecting portion and a second strut connecting portion arranged with a gap therebetween.

The method according to any preceding clause, wherein the first strut connecting portion and the second strut connecting portion are woven integral with the inner hub hoop preform.

The method according to any preceding clause, wherein the three-dimensional woven fabric pi-joint preform includes a base portion, the first strut connecting portion extending from the base portion and the second strut connecting portion extending from the base portion, and the base portion is connected to the inner hub hoop preform.

The method according to any preceding clause, wherein, for each bifurcated strut portion, the bifurcated strut portion is inserted into the gap of a respective one of the inner hub pi-joint preforms, and the bifurcated strut portion is connected to the first strut connecting portion and is connected to the second strut connecting portion.

The method according to any preceding clause, wherein the woven outer shell hoop preform includes a first half portion and a second half portion, the first half portion of the woven outer shell hoop preform includes a first first-half portion arranged in a middle of the first half portion of the woven outer shell hoop preform, a second first-half portion adjacent to the first first-half portion on a first side of the first first-half portion, a third first-half portion adjacent to the first first-half portion on a second side of the first first-half portion, a fourth first-half portion arranged adjacent to the second first-half portion, and a fifth first-half portion arranged adjacent to the third first-half portion, the first first-half portion being woven in a thickness direction with a first thickness, the second first-half portion and the third first-half portion being woven in the thickness direction with a second thickness less than the first thickness, and the fourth first-half portion and the fifth first-half portion being woven in the thickness direction with a third thickness less than the second thickness.

The method according to any preceding clause, wherein a first bifurcated strut portion is woven between the first first-half portion and the second first-half portion, a second bifurcated strut portion is woven between the first first-half portion and the third first-half portion, a third bifurcated strut portion is woven between the second first-half portion and the fourth first-half portion, and a fourth bifurcated strut portion is woven between the third first-half portion and the fifth first-half portion.

The method according to any preceding clause, wherein the second half portion of the woven outer shell hoop preform includes a first second-half portion arranged in a middle of the second half portion of the woven outer shell hoop preform, a second second-half portion adjacent to the first second-half portion on a first side of the first second-half portion, a third second-half portion adjacent to the first second-half portion on a second side of the first second-half portion, a fourth second-half portion arranged adjacent to the second second-half portion, and a fifth second-half portion arranged adjacent to the third second-half portion, the first second-half portion being woven in the thickness direction with the first thickness, the second second-half portion and the third second-half portion being woven in the thickness direction with the second thickness less than the first thickness, and the fourth second-half portion and the fifth second-half portion being woven in the thickness direction with the third thickness less than the second thickness.

The method according to any preceding clause, wherein a first bifurcated strut portion is woven between the first second-half portion and the second second-half portion, a second bifurcated strut portion is woven between the first second-half portion and the third second-half portion, a third bifurcated strut portion is woven between the second second-half portion and the fourth second-half portion, and a fourth bifurcated strut portion is woven between the third second-half portion and the fifth second-half portion.

The method according to any preceding clause, wherein at least one additional preform layer is added to at least one of an exterior side of the first first-half portion, an exterior side of the second first-half portion, an exterior side of the third first-half portion, an exterior side of the fourth first-half portion, an exterior side of the fifth first-half portion, an exterior side of the first second-half portion, an exterior side of the second second-half portion, an exterior side of the third second-half portion, an exterior side of the fourth second-half portion, or an exterior side of the fifth second-half portion, to increase the thickness in the thickness direction of the respective portion.

The method according to any preceding clause, wherein the at least one additional preform layer is one of a three-dimensional preform layer or a two-dimensional preform layer.

A composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the composite component being manufactured by: weaving an initial outer shell hoop preform including a plurality of bifurcated strut portions on an exterior side of the initial outer shell hoop preform, turning the initial outer shell hoop preform inside-out to form a woven outer shell hoop preform such that an exterior side of the initial outer shell hoop preform is an interior side of the woven outer shell hoop preform and the bifurcated strut portions are arranged on the interior side of the woven outer shell hoop preform to extend inward, installing the woven outer shell hoop preform onto a mold tooling structure, installing an inner hub hoop preform onto the mold tooling structure, the inner hub hoop preform including a plurality of inner hub pi-joint members arranged on an outer side of the inner hub hoop preform, inserting respective ones of the plurality of bifurcated strut portions of the woven outer shell hoop preform into respective ones of the plurality of inner hub pi-joint members, and connecting the respective ones of the plurality of bifurcated strut portions to the respective ones of the plurality of inner hub pi-joint members, injecting a matrix material into the mold tooling structure, and applying a curing process to the mold tooling structure to obtain a molded composite component.

The composite component according to the preceding clause, wherein the composite component is one of an outlet guide vane structure, an inlet guide vane structure, or a stator vane structure.

The composite component according to any preceding clause, wherein the initial outer shell hoop preform is woven in a flattened state, and is opened to an open state with the bifurcated strut portions extending outward from the exterior side of the initial outer shell hoop preform prior to turning the initial outer shell hoop preform inside-out.

The composite component according to any preceding clause, wherein one or more additional preform layers is added to at least one of an interior side of the woven outer shell hoop preform between a respective pair of the bifurcated strut portions, or to an outer side of the inner hub hoop preform between the respective pair of the bifurcated strut portions.

The composite component according to any preceding clause, wherein one or more additional vane preform layers is added to at least one of the plurality of bifurcated strut portions.

The composite component according to any preceding clause, wherein the one or more additional vane preform layers are added to form a vane airfoil structure.

The composite component according to any preceding clause, wherein the one or more additional vane preform layers is at least one of a three-dimensional preform layer or a two-dimensional preform layer.

The composite component according to any preceding clause, wherein the initial outer shell hoop preform is woven as a continuous three-dimensional outer shell hoop preform, and the inner hub hoop preform is woven as a continuous three-dimensional inner hub hoop preform.

The composite component according to any preceding clause, wherein, in weaving of the continuous three-dimensional inner hub hoop preform, weft fiber tows are woven in a hoop direction and warp fiber tows are woven in an axial direction, and, in the weaving of the continuous three-dimensional initial outer shell hoop preform, warp fiber tows are woven in the hoop direction and weft fiber tows are woven in the axial direction.

The composite component according to any preceding clause, further comprising weaving the inner hub hoop preform as the continuous three-dimensional inner hub hoop preform, and connecting the plurality of inner hub pi-joint members to the woven inner hub hoop preform, the plurality of inner hub pi-joint members extending outward from the outer side of the woven inner hub hoop preform.

The composite component according to any preceding clause, wherein each of the plurality of inner hub pi-joint members is a three-dimensional woven fabric pi-joint preform including a first strut connecting portion and a second strut connecting portion arranged with a gap therebetween.

The composite component according to any preceding clause, wherein the first strut connecting portion and the second strut connecting portion are woven integral with the inner hub hoop preform.

The composite component according to any preceding clause, wherein the three-dimensional woven fabric pi-joint preform includes a base portion, the first strut connecting portion extending from the base portion and the second strut connecting portion extending from the base portion, and the base portion is connected to the inner hub hoop preform.

The composite component according to any preceding clause, wherein, for each bifurcated strut portion, the bifurcated strut portion is inserted into the gap of a respective one of the inner hub pi-joint preforms, and the bifurcated strut portion is connected to the first strut connecting portion and is connected to the second strut connecting portion.

The composite component according to any preceding clause, wherein the woven outer shell hoop preform includes a first half portion and a second half portion, the first half portion of the woven outer shell hoop preform includes a first first-half portion arranged in a middle of the first half portion of the woven outer shell hoop preform, a second first-half portion adjacent to the first first-half portion on a first side of the first first-half portion, a third first-half portion adjacent to the first first-half portion on a second side of the first first-half portion, a fourth first-half portion arranged adjacent to the second first-half portion, and a fifth first-half portion arranged adjacent to the third first-half portion, the first first-half portion being woven in a thickness direction with a first thickness, the second first-half portion and the third first-half portion being woven in the thickness direction with a second thickness less than the first thickness, and the fourth first-half portion and the fifth first-half portion being woven in the thickness direction with a third thickness less than the second thickness.

The composite component according to any preceding clause, wherein a first bifurcated strut portion is woven between the first first-half portion and the second first-half portion, a second bifurcated strut portion is woven between the first first-half portion and the third first-half portion, a third bifurcated strut portion is woven between the second first-half portion and the fourth first-half portion, and a fourth bifurcated strut portion is woven between the third first-half portion and the fifth first-half portion.

The composite component according to any preceding clause, wherein the second half portion of the woven outer shell hoop preform includes a first second-half portion arranged in a middle of the second half portion of the woven outer shell hoop preform, a second second-half portion adjacent to the first second-half portion on a first side of the first second-half portion, a third second-half portion adjacent to the first second-half portion on a second side of the first second-half portion, a fourth second-half portion arranged adjacent to the second second-half portion, and a fifth second-half portion arranged adjacent to the third second-half portion, the first second-half portion being woven in the thickness direction with the first thickness, the second second-half portion and the third second-half portion being woven in the thickness direction with the second thickness less than the first thickness, and the fourth second-half portion and the fifth second-half portion being woven in the thickness direction with the third thickness less than the second thickness.

The composite component according to any preceding clause, wherein a first bifurcated strut portion is woven between the first second-half portion and the second second-half portion, a second bifurcated strut portion is woven between the first second-half portion and the third second-half portion, a third bifurcated strut portion is woven between the second second-half portion and the fourth second-half portion, and a fourth bifurcated strut portion is woven between the third second-half portion and the fifth second-half portion.

The composite component according to any preceding clause, wherein at least one additional preform layer is added to at least one of an exterior side of the first first-half portion, an exterior side of the second first-half portion, an exterior side of the third first-half portion, an exterior side of the fourth first-half portion, an exterior side of the fifth first-half portion, an exterior side of the first second-half portion, an exterior side of the second second-half portion, an exterior side of the third second-half portion, an exterior side of the fourth second-half portion, or an exterior side of the fifth second-half portion, to increase the thickness in the thickness direction of the respective portion.

The composite component according to any preceding clause, wherein the at least one additional preform layer is one of a three-dimensional preform layer or a two-dimensional preform layer.

A gas turbine engine including, a turbo-engine that drives a fan, a nacelle surrounding the turbo-engine, a fan bypass airflow passage being defined between the turbo-engine and the nacelle, and an outlet guide vane structure connecting the turbo-engine and the nacelle and being arranged downstream of the fan, the outlet guide vane structure being formed as a composite component including an outer shell extending circumferentially about a centerline axis, an inner hub extending circumferentially about the centerline axis, and a plurality of circumferentially spaced apart struts connecting the outer shell and the inner hub, the composite component being manufactured by: weaving an initial outer shell hoop preform including a plurality of bifurcated strut portions on an exterior side of the initial outer shell hoop preform, turning the initial outer shell hoop preform inside-out to form a woven outer shell hoop preform such that an exterior side of the initial outer shell hoop preform is an interior side of the woven outer shell hoop preform and the bifurcated strut portions are arranged on the interior side of the woven outer shell hoop preform to extend inward, installing the woven outer shell hoop preform onto a mold tooling structure, installing an inner hub hoop preform onto the mold tooling structure, the inner hub hoop preform including a plurality of inner hub pi-joint members arranged on an outer side of the inner hub hoop preform, inserting respective ones of the plurality of bifurcated strut portions of the woven outer shell hoop preform into respective ones of the plurality of inner hub pi-joint members, and connecting the respective ones of the plurality of bifurcated strut portions to the respective ones of the plurality of inner hub pi-joint members, injecting a matrix material into the mold tooling structure, and applying a curing process to the mold tooling structure to obtain a molded composite component.

The gas turbine engine according to the preceding clause, wherein the composite component is one of an outlet guide vane structure, an inlet guide vane structure, or a stator vane structure.

The gas turbine engine according to any preceding clause, wherein the initial outer shell hoop preform is woven in a flattened state, and is opened to an open state with the bifurcated strut portions extending outward from the exterior side of the initial outer shell hoop preform prior to turning the initial outer shell hoop preform inside-out.

The gas turbine engine according to any preceding clause, wherein one or more additional preform layers is added to at least one of an interior side of the woven outer shell hoop preform between a respective pair of the bifurcated strut portions, or to an outer side of the inner hub hoop preform between the respective pair of the bifurcated strut portions.

The gas turbine engine according to any preceding clause, wherein one or more additional vane preform layers is added to at least one of the plurality of bifurcated strut portions.

The gas turbine engine according to any preceding clause, wherein the one or more additional vane preform layers are added to form a vane airfoil structure.

The gas turbine engine according to any preceding clause, wherein the one or more additional vane preform layers is at least one of a three-dimensional preform layer or a two-dimensional preform layer.

The gas turbine engine according to any preceding clause, wherein the initial outer shell hoop preform is woven as a continuous three-dimensional outer shell hoop preform, and the inner hub hoop preform is woven as a continuous three-dimensional inner hub hoop preform.

The gas turbine engine according to any preceding clause, wherein, in weaving of the continuous three-dimensional inner hub hoop preform, weft fiber tows are woven in a hoop direction and warp fiber tows are woven in an axial direction, and, in the weaving of the continuous three-dimensional initial outer shell hoop preform, warp fiber tows are woven in the hoop direction and weft fiber tows are woven in the axial direction.

The gas turbine engine according to any preceding clause, further comprising weaving the inner hub hoop preform as the continuous three-dimensional inner hub hoop preform, and connecting the plurality of inner hub pi-joint members to the woven inner hub hoop preform, the plurality of inner hub pi-joint members extending outward from the outer side of the woven inner hub hoop preform.

The gas turbine engine according to any preceding clause, wherein each of the plurality of inner hub pi-joint members is a three-dimensional woven fabric pi-joint preform including a first strut connecting portion and a second strut connecting portion arranged with a gap therebetween.

The gas turbine engine according to any preceding clause, wherein the first strut connecting portion and the second strut connecting portion are woven integral with the inner hub hoop preform.

The gas turbine engine to any preceding clause, wherein the three-dimensional woven fabric pi-joint preform includes a base portion, the first strut connecting portion extending from the base portion and the second strut connecting portion extending from the base portion, and the base portion is connected to the inner hub hoop preform.

The gas turbine engine according to any preceding clause, wherein, for each bifurcated strut portion, the bifurcated strut portion is inserted into the gap of a respective one of the inner hub pi-joint preforms, and the bifurcated strut portion is connected to the first strut connecting portion and is connected to the second strut connecting portion.

The gas turbine engine according to any preceding clause, wherein the woven outer shell hoop preform includes a first half portion and a second half portion, the first half portion of the woven outer shell hoop preform includes a first first-half portion arranged in a middle of the first half portion of the woven outer shell hoop preform, a second first-half portion adjacent to the first first-half portion on a first side of the first first-half portion, a third first-half portion adjacent to the first first-half portion on a second side of the first first-half portion, a fourth first-half portion arranged adjacent to the second first-half portion, and a fifth first-half portion arranged adjacent to the third first-half portion, the first first-half portion being woven in a thickness direction with a first thickness, the second first-half portion and the third first-half portion being woven in the thickness direction with a second thickness less than the first thickness, and the fourth first-half portion and the fifth first-half portion being woven in the thickness direction with a third thickness less than the second thickness.

The gas turbine engine according to any preceding clause, wherein a first bifurcated strut portion is woven between the first first-half portion and the second first-half portion, a second bifurcated strut portion is woven between the first first-half portion and the third first-half portion, a third bifurcated strut portion is woven between the second first-half portion and the fourth first-half portion, and a fourth bifurcated strut portion is woven between the third first-half portion and the fifth first-half portion.

The gas turbine engine according to any preceding clause, wherein the second half portion of the woven outer shell hoop preform includes a first second-half portion arranged in a middle of the second half portion of the woven outer shell hoop preform, a second second-half portion adjacent to the first second-half portion on a first side of the first second-half portion, a third second-half portion adjacent to the first second-half portion on a second side of the first second-half portion, a fourth second-half portion arranged adjacent to the second second-half portion, and a fifth second-half portion arranged adjacent to the third second-half portion, the first second-half portion being woven in the thickness direction with the first thickness, the second second-half portion and the third second-half portion being woven in the thickness direction with the second thickness less than the first thickness, and the fourth second-half portion and the fifth second-half portion being woven in the thickness direction with the third thickness less than the second thickness.

The gas turbine engine according to any preceding clause, wherein a first bifurcated strut portion is woven between the first second-half portion and the second second-half portion, a second bifurcated strut portion is woven between the first second-half portion and the third second-half portion, a third bifurcated strut portion is woven between the second second-half portion and the fourth second-half portion, and a fourth bifurcated strut portion is woven between the third second-half portion and the fifth second-half portion.

The gas turbine engine according to any preceding clause, wherein at least one additional preform layer is added to at least one of an exterior side of the first first-half portion, an exterior side of the second first-half portion, an exterior side of the third first-half portion, an exterior side of the fourth first-half portion, an exterior side of the fifth first-half portion, an exterior side of the first second-half portion, an exterior side of the second second-half portion, an exterior side of the third second-half portion, an exterior side of the fourth second-half portion, or an exterior side of the fifth second-half portion, to increase the thickness in the thickness direction of the respective portion.

The gas turbine engine according to any preceding clause, wherein the at least one additional preform layer is one of a three-dimensional preform layer or a two-dimensional preform layer.

Although the foregoing description is directed to the preferred embodiments, other variations and modifications will be apparent to those skilled in the art, and may be made without departing from the present disclosure. Moreover, features described in connection with one embodiment may be used in conjunction with other embodiments, even if not explicitly stated above.

The invention claimed is:

1. A method of manufacturing a composite component for a gas turbine engine, the composite component including an outer shell extending circumferentially about a centerline axis, an inner hub extending circumferentially about the centerline axis, and a plurality of circumferentially spaced apart struts connecting the outer shell and the inner hub, the method comprising:

weaving an initial outer shell hoop preform including a plurality of bifurcated strut portions on an exterior side of the initial outer shell hoop preform;

turning the initial outer shell hoop preform inside-out to form a woven outer shell hoop preform such that an exterior side of the initial outer shell hoop preform is an interior side of the woven outer shell hoop preform and the plurality of bifurcated strut portions are arranged on the interior side of the woven outer shell hoop preform to extend radially inward;

installing the woven outer shell hoop preform onto a mold tooling structure;

installing an inner hub hoop preform onto the mold tooling structure, the inner hub hoop preform including a plurality of inner hub pi-joint members arranged on an outer side of the inner hub hoop preform;

inserting respective ones of the plurality of bifurcated strut portions of the woven outer shell hoop preform into respective ones of the plurality of inner hub pi-joint members, and connecting the respective ones of the plurality of bifurcated strut portions to the respective ones of the plurality of inner hub pi-joint members;

injecting a matrix material into the mold tooling structure; and applying a curing process to the mold tooling structure to obtain a molded composite component.

2. The method according to claim 1, wherein the composite component is one of an outlet guide vane structure, an inlet guide vane structure, or a stator vane structure.

3. The method according to claim 1, wherein the initial outer shell hoop preform is woven in a flattened state, and is opened to an open state with the bifurcated strut portions extending radially outward from the exterior side of the initial outer shell hoop preform prior to turning the initial outer shell hoop preform inside-out.

4. The method according to claim 1, wherein one or more additional preform layers is added to at least one of an interior side of the woven outer shell hoop preform between a respective pair of the bifurcated strut portions, or to an outer side of the inner hub hoop preform between the respective pair of the bifurcated strut portions.

5. The method according to claim 1, wherein one or more additional vane preform layers is added to at least one of the plurality of bifurcated strut portions.

6. The method according to claim 5, wherein the one or more additional vane preform layers are added to form a vane airfoil structure.

7. The method according to claim 6, wherein the one or more additional vane preform layers is at least one of a three-dimensional preform layer or a two-dimensional preform layer.

8. The method according to claim 1, wherein the initial outer shell hoop preform is woven as a continuous three-dimensional outer shell hoop preform, and the inner hub hoop preform is woven as a continuous three-dimensional inner hub hoop preform.

9. The method according to claim 8, wherein, in weaving of the continuous three-dimensional inner hub hoop preform, weft fiber tows are woven in a hoop direction and warp fiber tows are woven in an axial direction, and, in the weaving of the continuous three-dimensional outer shell hoop preform, warp fiber tows are woven in the hoop direction and weft fiber tows are woven in the axial direction.

10. The method according to claim 8, further comprising weaving the inner hub hoop preform as the continuous three-dimensional inner hub hoop preform, and connecting the plurality of inner hub pi-joint members to the woven inner hub hoop preform, the plurality of inner hub pi-joint members extending radially outward from the outer side of the woven inner hub hoop preform.

11. The method according to claim 10, wherein each of the plurality of inner hub pi-joint members is a three-dimensional woven fabric pi-joint preform including a first strut connecting portion and a second strut connecting portion arranged with a gap therebetween.

12. The method according to claim 11, wherein the first strut connecting portion and the second strut connecting portion are woven integral with the inner hub hoop preform.

13. The method according to claim 11, wherein the three-dimensional woven fabric pi-joint preform includes a base portion, the first strut connecting portion extending from the base portion and the second strut connecting portion extending from the base portion, and the base portion is connected to the inner hub hoop preform.

14. The method according to claim 11, wherein, for each bifurcated strut portion, the bifurcated strut portion is inserted into the gap of a respective inner hub pi-joint preform, and the bifurcated strut portion is connected to the first strut connecting portion and is connected to the second strut connecting portion.

15. The method according to claim 1, wherein the woven outer shell hoop preform includes a first half portion and a second half portion, the first half portion of the woven outer shell hoop preform includes a first first-half portion arranged in a middle of the first half portion of the woven outer shell hoop preform, a second first-half portion adjacent to the first first-half portion on a first side of the first first-half portion, a third first-half portion adjacent to the first first-half portion on a second side of the first first-half portion, a fourth first-half portion arranged adjacent to the second first-half portion, and a fifth first-half portion arranged adjacent to the third first-half portion, the first first-half portion being woven in a thickness direction with a first thickness, the second first-half portion and the third first-half portion being woven in the thickness direction with a second thickness less than the first thickness, and the fourth first-half portion and the fifth first-half portion being woven in the thickness direction with a third thickness less than the second thickness.

16. The method according to claim 15, wherein a first bifurcated strut portion is woven between the first first-half portion and the second first-half portion, a second bifurcated strut portion is woven between the first first-half portion and the third first-half portion, a third bifurcated strut portion is woven between the second first-half portion and the fourth first-half portion, and a fourth bifurcated strut portion is woven between the third first-half portion and the fifth first-half portion.

17. The method according to claim 15, wherein the second half portion of the woven outer shell hoop preform includes a first second-half portion arranged in a middle of the second half portion of the woven outer shell hoop preform, a second second-half portion adjacent to the first second-half portion on a first side of the first second-half portion, a third second-half portion adjacent to the first second-half portion on a second side of the first second-half portion, a fourth second-half portion arranged adjacent to the second second-half portion, and a fifth second-half portion arranged adjacent to the third second-half portion, the first second-half portion being woven in the thickness direction with the first thickness, the second second-half portion and the third second-half portion being woven in the thickness direction with the second thickness less than the first thickness, and the fourth second-half portion and the fifth second-half portion being woven in the thickness direction with the third thickness less than the second thickness.

18. The method according to claim 17, wherein a first bifurcated strut portion is woven between the first second-half portion and the second second-half portion, a second bifurcated strut portion is woven between the first second-half portion and the third second-half portion, a third bifurcated strut portion is woven between the second second-half portion and the fourth second-half portion, and a fourth bifurcated strut portion is woven between the third second-half portion and the fifth second-half portion.

19. The method according to claim 17, wherein at least one additional preform layer is added to at least one of an exterior side of the first first-half portion, an exterior side of the second first-half portion, an exterior side of the third first-half portion, an exterior side of the fourth first-half portion, an exterior side of the fifth first-half portion, an exterior side of the first second-half portion, an exterior side of the second second-half portion, an exterior side of the third second-half portion, an exterior side of the fourth second-half portion, or an exterior side of the fifth second-half portion, to increase the thickness in the thickness direction of the respective portion.

20. The method according to claim 19, wherein the at least one additional preform layer is one of a three-dimensional preform layer or a two-dimensional preform layer.

* * * * *